US012800497B2

United States Patent
(12) United States Patent
Acharya et al.

(10) Patent No.: US 12,800,497 B2
(45) Date of Patent: Nov. 17, 2026

(54) OPTICAL SYSTEM, OPTICAL CONSTRUCTION, OPTICALLY RECYCLING MULTI-WELL PLATE, AND OPTICAL DETECTION SYSTEM

(71) Applicant: 3M INNOVATIVE PROPERTIES COMPANY, St. Paul, MN (US)

(72) Inventors: Bharat R. Acharya, Woodbury, MN (US); John A. Wheatley, Stillwater, MN (US); David A. Rosen, North Saint Paul, MN (US); Brett J. Sitter, Marine on St Croix, MN (US); Aaron M. Marcella, White Bear Lake, MN (US); Jonah Shaver, Saint Paul, MN (US); Michael L. Steiner, New Richmond, WI (US); Raj Rajagopal, Woodbury, MN (US); Gregory W. Sitton, Minneapolis, MN (US); Zhaohui Yang, North Oaks, MN (US); Jessica E. DeMay, Maplewood, MN (US)

(73) Assignee: 3M Innovative Properties Company, St. Paul, MN (US)

(*) Notice: Subject to any disclaimer, the term of this patent is extended or adjusted under 35 U.S.C. 154(b) by 470 days.

(21) Appl. No.: 18/293,868

(22) PCT Filed: Jul. 29, 2022

(86) PCT No.: PCT/IB2022/057085
§ 371 (c)(1),
(2) Date: Jan. 31, 2024

(87) PCT Pub. No.: WO2023/012630
PCT Pub. Date: Feb. 9, 2023

(65) Prior Publication Data
US 2026/0126386 A1 May 7, 2026

Related U.S. Application Data

(60) Provisional application No. 63/203,834, filed on Aug. 2, 2021.

(51) Int. Cl.
*G01N 21/64* (2006.01)
*G01N 21/77* (2006.01)

(52) U.S. Cl.
CPC .......... *G01N 21/645* (2013.01); *G01N 21/77* (2013.01); *G01N 2201/0636* (2013.01)

(58) Field of Classification Search
CPC ......... G01N 2021/6417; G01N 21/645; G01N 21/6452; G01N 2021/6463; G01N 21/77
(Continued)

(56) References Cited

U.S. PATENT DOCUMENTS

| | | | |
|---|---|---|---|
| 6,331,276 | B1 | 12/2001 | Takei et al. |
| 6,685,331 | B1 | 2/2004 | Rockwell |

(Continued)

FOREIGN PATENT DOCUMENTS

| | | | |
|---|---|---|---|
| WO | 2006033914 | A2 | 3/2006 |
| WO | 2006090753 | A1 | 8/2006 |

(Continued)

OTHER PUBLICATIONS

International Search Report for PCT International Application No. PCT/IB2022/057085, mailed on Nov. 18, 2022, 3 pages.

*Primary Examiner* — Arlen Soderquist
(74) *Attorney, Agent, or Firm* — Jonathan L. Tolstedt

(57) ABSTRACT

An optical system includes a backlight configured to emit light from an emission surface thereof, and a front reflector. The backlight includes at least one light source configured to emit a first light having at least a first wavelength. The front reflector is disposed on a back reflector and defines a recycling optical cavity therebetween. The front reflector
(Continued)

defines at least one opening therein. When a test material is disposed in the recycling optical cavity, the test material is configured to emit a second light having at least a second wavelength in response to a stimulus. The emitted second light exits the optical system through the at least one opening of the front reflector after being recycled in the recycling optical cavity. The recycling affects an optical intensity of the exiting light.

10 Claims, 19 Drawing Sheets

(58) Field of Classification Search
USPC ....... 422/82.08, 407, 552–553; 436/165, 172
See application file for complete search history.

(56) References Cited

U.S. PATENT DOCUMENTS

| | | | | |
|---|---|---|---|---|
| 7,655,475 | B2 | 2/2010 | Maccraith et al. | |
| 8,088,628 | B2 | 1/2012 | Berlin et al. | |
| 8,318,094 | B1 * | 11/2012 | Bayandorian | G01N 35/0099 422/62 |
| 2007/0165154 | A1 * | 7/2007 | Whitney | G02F 1/133605 349/61 |
| 2009/0325164 | A1 * | 12/2009 | Vossenaar | G01N 21/0332 435/287.2 |
| 2010/0067257 | A1 * | 3/2010 | Meis | G02B 6/0055 362/624 |
| 2010/0310427 | A1 * | 12/2010 | Holmes | B01L 9/523 422/519 |
| 2010/0321696 | A1 | 12/2010 | Malik et al. | |
| 2011/0261584 | A1 * | 10/2011 | Boyd | G02B 6/0053 362/607 |
| 2014/0036267 | A1 | 2/2014 | Malik et al. | |
| 2014/0056762 | A1 * | 2/2014 | Giovanoli | G01N 1/286 422/63 |
| 2015/0118690 | A1 | 4/2015 | Jasperse et al. | |
| 2015/0192728 | A1 * | 7/2015 | Thompson | G02B 6/005 362/624 |
| 2021/0072148 | A1 | 3/2021 | Gillespie et al. | |
| 2023/0092755 | A1 | 3/2023 | Acharya et al. | |

FOREIGN PATENT DOCUMENTS

| | | | |
|---|---|---|---|
| WO | 2009100307 | A1 | 8/2009 |
| WO | 2012003247 | A2 | 1/2012 |
| WO | 2012012118 | A2 | 1/2012 |
| WO | 2021044257 | A1 | 3/2021 |

* cited by examiner

OPTICAL SYSTEM, OPTICAL CONSTRUCTION, OPTICALLY RECYCLING MULTI-WELL PLATE, AND OPTICAL DETECTION SYSTEM

CROSS REFERENCE TO RELATED APPLICATIONS

This application is a national stage filing under 35 U.S.C. 371 of PCT/IB2022/057085, filed Jul. 29, 2022, which claims the benefit of U.S. Provisional Application No. 63/203,834, filed Aug. 2, 2021, the disclosures of which are incorporated by reference in their entireties herein.

TECHNICAL FIELD

The present disclosure relates, in general, to an optical system and an optical detection system. In particular, the present disclosure relates to an optical system including an optical construction, and an optical detection system including an optically recycling multi-well plate.

BACKGROUND

In some cases, optical methods are implemented for detection of target analytes, i.e., the presence of target analytes may alter one or more optical characteristics of a light in response to a stimulus, or stimuli. Conventionally, the light in response to the stimulus, or the stimuli has a low optical intensity.

SUMMARY

In a first aspect, the present disclosure provides an optical system including a backlight and a front reflector. The backlight is configured to emit a light from an emission surface thereof. The backlight includes at least one light source configured to emit a first light having at least a first wavelength. The backlight further includes at least one light redirecting film disposed on a back reflector for at least redirecting the first light emitted by the at least one light source. The emission surface, the at least one light redirecting film, and the back reflector are substantially co-extensive with each other in length and width. The front reflector is disposed on the back reflector and defines a recycling optical cavity therebetween. The front reflector defines at least one opening therein. For a substantially normally incident light, each of the back reflector and at least a first region of the front reflector adjacent the at least one opening reflects at least 60% of the incident light for each of the at least the first wavelength and a different at least a second wavelength. Further, for the substantially normally incident light, the at least one opening and at least the first region of the front reflector have respective optical transmittances T1 and T2 at the at least the second wavelength, T1>1.2 T2, such that when a test material is disposed in the recycling optical cavity, the test material is configured to emit a second light having the at least the second wavelength in response to a stimulus, and the emitted second light exits the optical system through the at least one opening of the front reflector after being recycled in the recycling optical cavity. The recycling affects an optical characteristic of the exiting light. In some cases, the optical characteristic of the exiting light is an optical intensity of the exiting light.

In a second aspect, the present disclosure provides an optical system including a backlight and a plurality of optical cells. The backlight is configured to provide substantially polarized illumination to optical cells through an emission surface thereof. In some cases, the backlight is configured to provide substantially polarized illumination to a display panel through the emission surface thereof. The backlight includes a back reflector substantially co-extensive in length and width with the emission surface. The plurality of optical cells is disposed on and arranged across the emission surface. Each of the optical cells includes a top wall disposed on, and spaced apart from, the emission surface and defining at least one output window therein. The at least one output window has a total area A1. The at least one output window is surrounded by a remaining portion of the top wall. The top wall and the back reflector of the backlight define an optical recycling cavity therebetween. For a substantially normally incident light having a signal wavelength, each of the back reflector and the remaining portion of the top wall has an optical reflectance of at least 60% and the at least one output window has an optical transmittance of at least 60%. The optical cell is configured to receive therein a test material. The test material is configured to emit a signal light having the signal wavelength in response to a stimulus. The emitted signal light exits the optical cell through the at least one output window after being recycled in the recycling optical cavity. The recycling enhances an optical characteristic of the exiting light. In some cases, the optical characteristic of the exiting light is an optical intensity of the exiting light.

In a third aspect, the present disclosure provides an optical construction. The optical construction includes a bottom reflector. The optical construction further includes a top reflector disposed on the bottom reflector. The optical construction further includes a middle reflector disposed between the top and bottom reflectors. The top reflector defines therein a plurality of spaced apart top groups of one or more top openings. The middle reflector defines therein a plurality of spaced apart middle groups of one or more middle openings. The top and middle groups are in a one-to-one correspondence with each other. For each of the corresponding groups of one or more top and middle openings, a total area of the top openings is less than a total area of the middle openings. Further, for each of the corresponding groups of one or more top and middle openings, the one or more top and middle openings are configured to receive a test material therebetween. The test material is configured to emit a signal light having a signal wavelength in response to a stimulus. For a substantially normally incident light having the signal wavelength, each of the top, middle and bottom reflectors has an optical reflectance of at least 60%. Further, the substantially normally incident light having the signal wavelength, each of the top and middle openings has an optical transmittance of at least 60%.

In a fourth aspect, the present disclosure provides an optical system including a backlight configured to emit a first light having a first wavelength from an emission surface thereof. The optical system further includes the optical construction of the third aspect disposed on the emission surface of the backlight so that the emission surface is disposed between the middle and bottom reflectors. The stimulus includes light at the first wavelength. The test material is configured to emit the signal light having the signal wavelength in response to at least being illuminated by the emitted first light having the first wavelength.

In a fifth aspect, the present disclosure provides an optical system including a backlight configured to provide substantially polarized uniform illumination to a display panel through an emission surface thereof. The backlight includes a back reflector substantially co-extensive in length and width with the emission surface. The uniform illumination includes at least first and second lights having respective at least first and second wavelengths. The optical system further includes a front reflector disposed on the backlight. The front and back reflectors define a recycling optical cavity therebetween. The front reflector defines at least one opening therein. For a substantially normally incident light, and for each of the at least first and second wavelengths, each of the back reflector and at least a first region of the front reflector adjacent the at least one opening reflects at least 60% of the incident light. Further, for the substantially normally incident light, and for each of the at least first and second wavelengths, the at least one opening transmits at least 60% of the incident light. When a test material is disposed in the recycling optical cavity, the test material is configured to absorb light at each of the first and second wavelengths. The first and second lights from the backlight exit the optical system through the at least one opening of the front reflector after being recycled in the recycling optical cavity. The recycling enhances a ratio of an optical intensity of one of the first and second lights to an optical intensity of the other of the first and second lights.

In a sixth aspect, the present disclosure provides an optical system including a light source configured to emit a first light having a first wavelength. The optical system further includes an optical structure configured to receive the first light emitted by the light source. The optical structure includes a top wall defining an output window therein. The optical structure further includes a bottom wall facing the top wall. The optical structure further includes an input wall defining an input window therein. For a substantially normally incident light, each of a first region of the top wall adjacent the output window and the bottom wall reflects at least 60% of the incident light for each of the first wavelength and a different second wavelength. For the substantially normally incident light, the output window transmits at least 60% of the incident light having the second wavelength and reflects at least 60% of the incident light having the first wavelength. Further, for the substantially normally incident light, the input window reflects at least 60% of the incident light having the second wavelength and transmits at least 60% of the incident light having the first wavelength.

In a seventh aspect, the present disclosure provides an optical system including a lightguide disposed between, and substantially co-extensive in length and width with, first and second optical reflectors. The optical system further includes a light source disposed at a side of the lightguide and configured to emit a first light having a first wavelength. The lightguide is configured to receive the emitted first light through the side and propagate the received first light therein along the length and width of the lightguide. The first optical reflector defines a first through opening therein, such that at least a portion of the first light propagating in the lightguide is transmitted by the first optical reflector through the first through opening. The optical system further includes an optical cell disposed on the first optical reflector. The optical cell includes a third optical reflector opposite a bottom. The third optical reflector defines a second through opening therein. The bottom of the optical cell substantially covers the first through opening of the first optical reflector so that the first light transmitted by the first through opening enters the optical cell. The optical cell is configured to receive therein a test material configured to emit a second light having a second wavelength, different than the first wavelength, in response to being at least illuminated by the first light entering the optical cell. The emitted second light exits the optical cell through the second through opening of the third optical reflector. For a substantially normally incident light having the second wavelength, each of the first through third optical reflectors has an optical reflectance of at least 60% for regions of the first through third optical reflectors away from any of the corresponding through openings. Further, for the substantially normally incident light, each of the first and second through openings has an optical transmittance of at least 60%.

In an eighth aspect, the present disclosure provides an optically recycling multi-well plate including a plurality of spaced apart wells. Each well includes a top reflector defining a first opening therein. Each well further includes a bottom reflector defining a second opening therein. Each well further includes one or more side walls extending from the top reflector to the bottom reflector, the top and bottom reflectors defining a recycling optical cavity therebetween. The recycling optical cavity is configured to receive therein a test material configured to emit a second light having a second wavelength in response to being at least illuminated by a first light having a different first wavelength and entering the recycling optical cavity through the second opening of the bottom reflector. The emitted second light exits the well through the first opening of the top reflector after being recycled in the recycling optical cavity. The recycling affects an optical characteristic of the exiting light. In some cases, the optical characteristic of the exiting light is an optical intensity of the exiting light. For at least the second wavelength, each of the top and bottom reflectors has an optical reflectance of at least 60% for regions of the top and bottom reflectors away from any of the corresponding openings.

In a ninth aspect, the present disclosure provides an optical detection system including a backlight configured to emit the first light from an emission surface thereof. The backlight includes at least one light source configured to produce the first light. The backlight further includes a back reflector for redirecting the first light produced by the at least one light source. The emission surface and the back reflector are substantially co-extensive with each other in length and width. The optical detection system further includes the optically recycling multi-well plate of the eighth aspect disposed on the emission surface of the backlight. The recycling optical cavity of each of the wells in the plurality of spaced apart wells is configured to receive, through the second opening of the bottom reflector of the well, at least a portion of the first light emitted from the emission surface of the backlight.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1A:
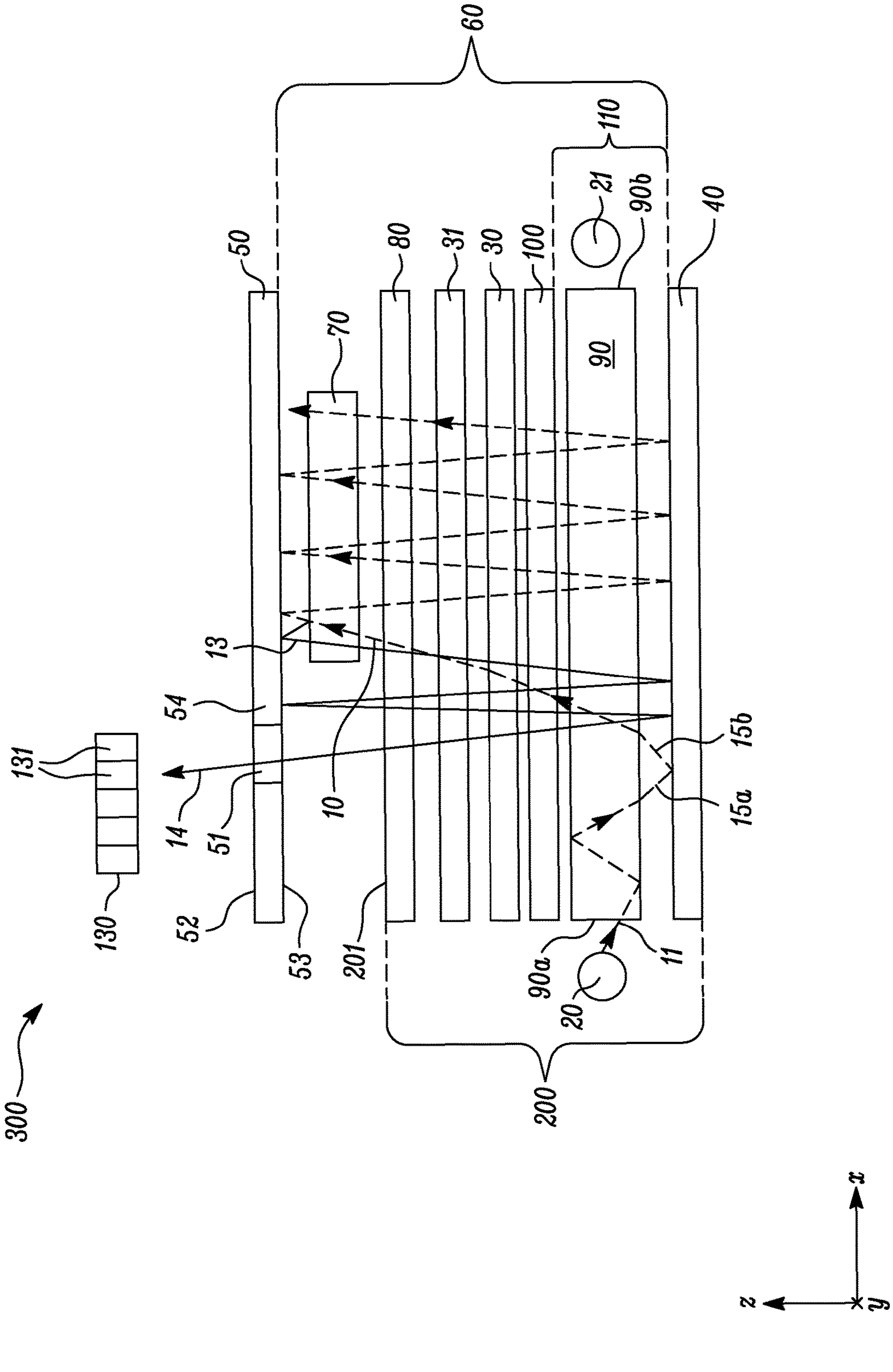
FIG. 1A illustrates a detailed schematic sectional view of an optical system including a backlight, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first", "second" and "third" are used as identifiers. Therefore, such terms should not be construed as limiting of this disclosure. The terms "first", "second" and "third", when used in conjunction with a feature or an element can be interchanged throughout the embodiments of this disclosure.

As used herein, "at least one of A and B" should be understood to mean "only A, only B, or both A and B".

As used herein, the term "between about", unless otherwise specifically defined, generally refers to an inclusive or a closed range. For example, if a parameter X is between about A and B, then $A \leq X \leq B$.

Various optical detection devices and methods are used for detecting or sensing a presence of an analyte. Specifically, it may be important to detect or sense target analytes. One of the conventional techniques for detecting the target analytes is an optical technique. In such a technique, the target analyte may be applied onto a test material, which may include a photoluminescent material. The photoluminescent material is subjected to a stimulus, such as an optical stimulus. Optical stimulus may include an incident light. A portion of the incident light may be absorbed by the test material, after which, the test material may emit an emitted light having a specific wavelength. In cases where the optical stimulus is used, the wavelength of the emitted light is generally different from a wavelength of the incident light.

A sensitivity of detection of the target analyte may depend on a utilization of the stimulus by molecules of the target analyte. An extent of utilization of the stimulus may further relate to an optical intensity of the emitted light by the test material. In some cases, greater the utilization of the stimulus by the test material, greater may be the optical intensity of the emitted light. Further, a greater optical intensity of the emitted light may facilitate a better detection of the emitted light.

In some applications, the test material may be stimulated using sources of light. However, conventional sources of light may generate light having a low optical intensity. Further, not all the light from the sources of light may be absorbed by the test material. Due to the low absorption of the light by the test material, the emitted light may also have of a low optical intensity. Further, in some conventional optical techniques for detecting the target analytes, only a single test material may be subjected to the optical stimulus or analyzed by an optical detector.

In an aspect, the present disclosure provides an optical system including a backlight and a front reflector. The backlight is configured to emit a light from an emission surface thereof. The backlight includes at least one light source configured to emit a first light having at least a first wavelength. The backlight further includes at least one light redirecting film disposed on a back reflector for at least redirecting the first light emitted by the at least one light source. The emission surface, the at least one light redirecting film, and the back reflector are substantially co-extensive with each other in length and width. The front reflector is disposed on the back reflector and defines a recycling optical cavity therebetween. The front reflector defines at least one opening therein. For a substantially normally incident light, each of the back reflector and at least a first region of the front reflector adjacent the at least one opening reflects at least 60% of the incident light for each of the at least the first wavelength and a different at least a second wavelength. Further, for the substantially normally incident light, the at least one opening and the at least the first region of the front reflector have respective optical transmittances T1 and T2 at the at least the second wavelength, T1>1.2 T2, such that when a test material is disposed in the recycling optical cavity, the test material is configured to emit a second light having the at least the second wavelength in response to a stimulus, and the emitted second light exits the optical system through the at least one opening of the front reflector after being recycled in the recycling optical cavity. The recycling affects an optical characteristics of the exiting light.

Further, in an aspect, the present disclosure provides an optically recycling multi-well plate including a plurality of spaced apart wells. Each well includes a top reflector defining a first opening therein. Each well further includes a bottom reflector defining a second opening therein. Each well further includes one or more side walls extending from the top reflector to the bottom reflector, the top and bottom reflectors defining a recycling optical cavity therebetween. The recycling optical cavity is configured to receive therein a test material configured to emit a second light having a second wavelength in response to being at least illuminated by a first light having a different first wavelength and entering the recycling optical cavity through the second opening of the bottom reflector. The emitted second light exits the well through the first opening of the top reflector after being recycled in the recycling optical cavity. The recycling affects an optical intensity of the exiting light. For at least the second wavelength, each of the top and bottom reflectors has an optical reflectance of at least 60% for regions of the top and bottom reflectors away from any of the corresponding openings.

Therefore, the recycling of the emitted light emitted by the test material in response to the stimulus in the recycling optical cavity affects the optical intensity of the exiting light. The optical intensity of the exiting light after being recycled in the recycling optical cavity may be such that the exiting light may be easily detected by an optical detector as compared to an emitted light that exits without being recycled in the recycling cavity. Therefore, the optical system may improve or enhance the optical intensity of the exiting light for detection of the emitted light by the optical detector.

Further, the first light may also be recycled in the recycling optical cavity. This may ensure that the test material is adequately exposed to the stimulus, i.e., the first light. This may allow better utilization of the first light. Further, the recycling of the first light may also affect an optical intensity of the first light. Therefore, the test material may receive the first light having a greater optical intensity.

Further, in some cases, a backlight of a conventional display device (e.g., a smartphone) may be used with an optical construction of the present disclosure for detecting or sensing the presence of the target analyte in the test material. Specifically, any backlight including a reflector may be used with the optical construction of the present disclosure to enhance the optical intensity of the exiting light.

In addition, the multi-well plate may allow analysis of multiple test materials simultaneously or sequentially using one backlight of the optical system.

Referring now to figures, FIG. 1A illustrates a detailed schematic sectional view of an optical system 300, according to an embodiment of the present disclosure. The optical system 300 defines mutually orthogonal x-, y-, and z-axes. The x- and y-axes correspond to in-plane axes of the optical system 300, while the z-axis is a transverse axis disposed along a thickness of the optical system 300. In other words, x- and y-axes are along a plane (i.e., x-y plane) of the optical system 300, and the z-axis is perpendicular to the plane of the optical system 300, i.e., along the thickness of the optical system 300.

The optical system 300 includes a backlight 200 configured to emit a light 10 from an emission surface 201 thereof. FIG. 1B illustrates a schematic top view of the backlight 200. Specifically, FIG. 1B illustrates a schematic top view of the emission surface 201 of the backlight 200, in the x-y plane. The backlight 200 defines a length L and a width W along in-plane axes of the backlight 200. Therefore, the emission surface 201 may also define a length and a width along the y- and x-axes, respectively.

Referring to FIGS. 1A and 1B, in some embodiments, the in-plane axes of the backlight 200 substantially corresponds to the in-plane axes of the optical system 300. In other words, the in-plane axes of the backlight 200 correspond to the x- and y-axes of the optical system 300. Further, in some embodiments, the length L may be substantially along the y-axis and the width W may be substantially along the x-axis.

Referring again to FIG. 1A, the backlight 200 includes at least one light source configured to emit a first light 11 having at least a first wavelength. In the illustrated embodiment of FIG. 1A, the backlight 200 includes first and second light sources 20, 21 configured to emit the first light 11 having the at least the first wavelength. Therefore, the at least one light source may include the first and second light sources 20, 21. The first and second light sources 20, 21 may be collectively referred to as “the at least one light source 20, 21”.

The backlight 200 further includes at least one light redirecting film. In the illustrated embodiment of FIG. 1A, the backlight 200 includes first and second light redirecting films 30, 31. Therefore, the at least one light redirecting film includes the first and second light redirecting films 30, 31. The first and second light redirecting films 30, 31 may be collectively referred to as “the at least one light redirecting film 30, 31”.

The at least one light redirecting film 30, 31 is disposed on a back reflector 40 for at least redirecting the first light 11 emitted by the at least one light source 20, 21. In some embodiments, the at least one light redirecting film 30, 31 receives, transmits, and at least redirects at least a portion of the first light 11 received from the at least one light source 20, 21, such that a light exiting the at least one light redirecting film 30, 31 substantially covers the emission surface 201.

The emission surface 201, the at least one light redirecting film 30, 31, and the back reflector 40 are substantially co-extensive with each other in length and width. In other words, the emission surface 201, the at least one light redirecting film 30, 31, and the back reflector 40 are substantially co-extensive with each other in the x-y plane, i.e., the emission surface 201, the at least one light redirecting film 30, 31, and the back reflector 40 have substantially similar in-plane dimensions in length (of about length L) and in width (of about width W).

In some embodiments, the backlight 200 further includes a reflective polarizer 80 disposed between the back reflector 40 and the emission surface 201. In some embodiments, the reflective polarizer 80 is disposed on the at least on light redirecting film 30, 31. In some embodiments, the reflective polarizer 80 includes the emission surface 201 of the backlight 200. In some embodiments, the reflective polarizer 80 may be a collimating multilayer optical film (CMOF). However, the reflective polarizer 80 may include any other suitable reflective polarizer. In some embodiments, the reflective polarizer 80 may include one or more of a multilayer polymeric reflective polarizer, a wire grid reflective polarizer, and a diffuse reflective polarizer.

In some embodiments, the backlight 200 further includes an optical diffuser 100 disposed between the emission surface 201 and the back reflector 40. In some embodiments, the optical diffuser 100 is configured to scatter the first light 11. In some embodiments, the optical diffuser 100 may include any film, layer, or substrates that are designed to diffuse light. This light diffusion may be affected, for example, through use of a textured surface of the substrate, or through other means such as incorporation of light diffusing particles within a matrix of the film. In some embodiments, the optical diffuser 100 may include a bulk diffuser, where small particles, or spheres of a different refractive index are embedded within a primary material of the bulk diffuser. The embedded small particles or spheres may act as light scattering elements. In some other embodiments, a refractive index of a material of the bulk diffuser may vary across a body of the bulk diffuser, thus causing light passing through the material to be refracted or scattered at different points. In some embodiments, the optical diffuser 100 may include a surface diffuser. The surface diffuser may utilize surface roughness to refract or scatter light in a number of directions. The rough surfaces of the surface diffuser may be exposed to air or a surrounding medium, and may cause the angular spread for an incident light.

In some embodiments, the optical diffuser 100 and the back reflector 40 define a backlight recycling cavity 110 therebetween.

In some embodiments, the backlight 200 further includes a lightguide 90 for propagating the first light 11 therein along a length and a width of the lightguide 90. The length and width of the lightguide 90 may substantially correspond to the length L and width W of the backlight 200.

In some embodiments, the lightguide 90 is disposed between the at least one light redirecting film 30, 31 and the back reflector 40. In some embodiments, the lightguide 90 is disposed in the backlight recycling cavity 110. In some embodiments, the lightguide 90 is a solid lightguide. In some embodiments, the lightguide 90 is a substantially hollow lightguide. In some embodiments, the lightguide 90 may be a step wedge lightguide. In some embodiments, the lightguide 90 may use total internal reflection (TIR) to transport or guide a light incident on the lightguide 90 towards the back reflector 40. In some cases, the lightguide 90 may improve uniformity of the light that may be incident on the back reflector 40 and/or the at least one light redirecting film 30, 31. The lightguide 90 may be configured to guide the first light 11 towards the back reflector 40, as a light 15*a* that exits the lightguide 90. At least a portion of the light 15*a* may be reflected by the back reflector 40 as a reflected light 15*b*. Specifically, the back reflector 40 is configured to reflect the light 15*a*, that exits the lightguide 90 propagating toward the back reflector 40, as the reflected light 15*b* propagating toward the at least one light redirecting film 30, 31.

In the illustrated embodiment of FIG. 1A, the backlight 200 has an edge lit configuration. In such embodiments, the at least one light source 20, 21 may not be disposed in the backlight recycling cavity 110. On the other hand, the first light 11 may enter the lightguide 90 from a side 90*a* and/or a side 90*b* of the lightguide 90. Specifically, the first light 11 from the first light source 20 may enter the lightguide 90 from the side 90*a*, and the first light 11 from the second light source 21 may enter the lightguide 90 from the side 90*b*.

With continued reference to FIG. 1A, the optical system 300 further includes a front reflector 50 disposed on the back reflector 40 and defining a recycling optical cavity 60 therebetween. In some embodiments, an average separation between the front and back reflectors 50, 40 is less than about 10 millimeters (mm). In some embodiments, the average separation between the front and back reflectors 50, 40 is less than about 8 mm, less than about 6 mm, less than about 4 mm, or less than about 2 mm. In other words, an average distance between the front and back reflectors 50, 40 along the z-axis may be less than about 10 mm, less than about 8 mm, less than about 6 mm, less than about 4 mm, or less than about 2 mm.

In some embodiments, the front and back reflectors 50, 40 are substantially co-extensive with each other in at least one of length and width. In other words, the front and back reflectors 50, 40 may have substantially similar in-plane dimensions in at least one of length (of about length L) and width (of about width W).

In some embodiments, the front and back reflectors 50, 40 are substantially co-extensive with each other in length and width. In other words, the front and back reflectors 50, 40 are substantially co-extensive with each other in the x-y plane, i.e., the front and back reflectors 50, 40 have substantially similar in-plane dimensions in length (of about length L) and in width (of about width W).

In some embodiments, the back reflector 40, the at least one light redirecting film 30, 31, the optical diffuser 100, the reflective polarizer 80, and the front reflector 50 are disposed substantially along the z-axis of the optical system 300 adjacent to each other. In some embodiments, the lightguide 90 is disposed substantially along the z-axis of the optical system 300 between the optical diffuser 100 and the back reflector 40.

The front reflector 50 further defines at least one opening 51 therein. Further, in some other embodiments, the front reflector 50 defines at least a first region 54 adjacent the at least one opening 51. In the illustrated embodiment of FIG. 1A, the at least one opening 51 includes one opening. However, in some other embodiments, the at least one opening 51 may include multiple openings. Similarly, the front reflector 50 may define multiple first regions adjacent the multiple openings.

In some embodiments, the front reflector 50 defines opposing first and second major surfaces 52, 53. In some embodiments, the second major surface 53 faces the back reflector 40. In some embodiments, at least one of the at least one opening 51 is an optical through opening 51*a* (shown in FIG. 1C) extending at least partially from the first major surface 52 of the front reflector 50 to the opposite second major surface 53 of the front reflector 50.

In some other embodiments, the at least one of the at least one opening 51 is a physical through opening extending from the first major surface 52 of the front reflector 50 to the opposite second major surface 53 of the front reflector 50.

Figure 1C:
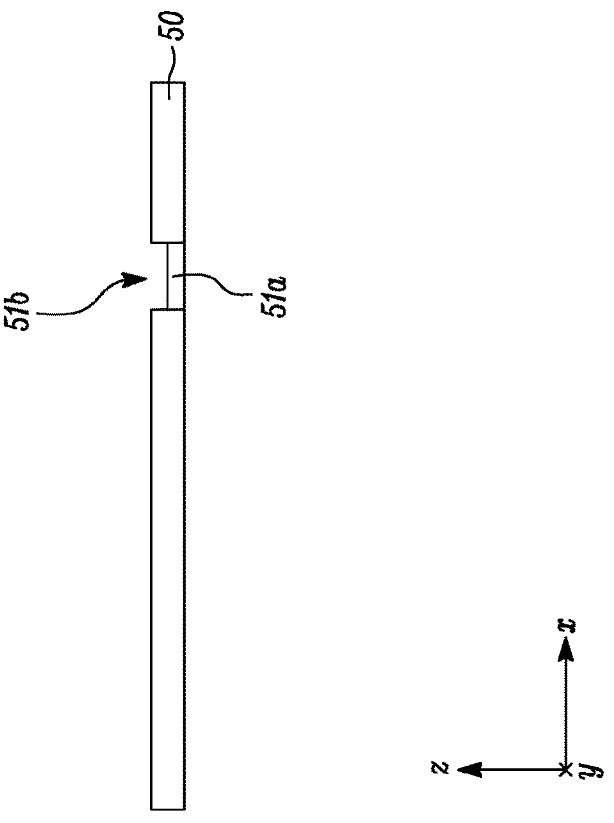
FIG. 1C illustrates a schematic sectional view of a front reflector, according to another embodiment of the present disclosure.
Figure 1B:
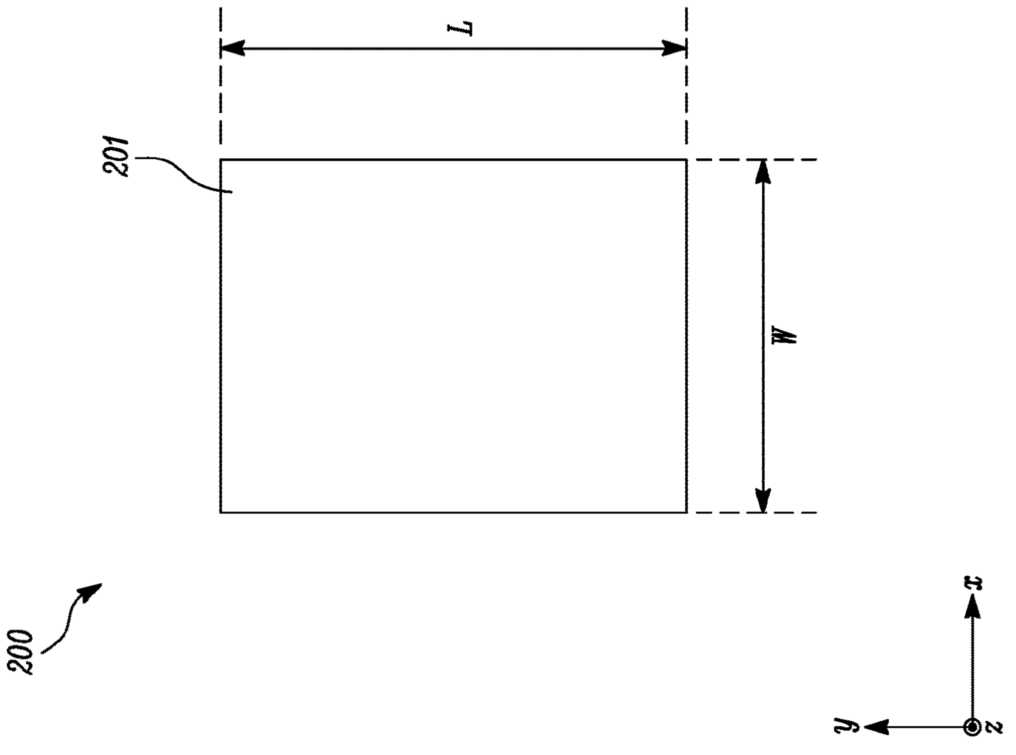
FIG. 1B illustrates a schematic top view of the backlight of FIG. 1A, according to an embodiment of the present disclosure.

FIG. 1C illustrates a schematic sectional view of the front reflector 50 including the optical through opening 51*a*, according to another embodiment of the present disclosure. In some embodiments, the front reflector 50 may be a spatially tailored optical film (STOF), where the optical through opening 51*a* may substantially include a region of the front reflector 50 with a reduced thickness so as to allow transmittance of light through the region. In some embodiments, the front reflector 50 is treated with at least one of heat and radiation to be more optically transmissive at the optical through opening 51*a*.

In some embodiments, the front reflector 50 includes a depression 51*b* at the optical through opening 51*a*. In the illustrated embodiment of FIG. 1C, the depression 51*b* partially extends from the first major surface 52 (shown in FIG. 1A) of the front reflector 50 to the opposite second major surface 53 (shown in FIG. 1A) of the front reflector 50.

In some embodiments, a total area of the at least one opening 51 is less than about 30% of an area of the front reflector 50. In other words, the area of the at least one opening 51 is substantially less than the area of the front reflector 50. In some embodiments, the total area of the at least one opening 51 is less than about 25%, less than about 20%, less than about 15%, less than about 10%, or less than about 5% of the area of the front reflector 50. In cases the at least one opening 51 includes multiple openings, the total area may correspond to a sum of areas of the multiple openings.

In some embodiments, the total area of the at least one opening 51 may be measured on the first major surface 52 and/or on the second major surface 53. In some embodiments, an area of the at least one opening 51 on the first major surface 52 and an area of the at least one opening 51 on the second major surface 53 may be substantially similar, or may be different from each other based on a shape of the at least one opening 51. Further, the at least one opening 51 may be substantially rectangular, substantially square, substantially circular, or may be otherwise substantially polygonal.

With continued reference to FIG. 1A, a test material 70 is shown disposed in the recycling optical cavity 60. In some embodiments, the test material 70 includes one or more of a solid material, a fluid material, and a gaseous material.

When the test material 70 is disposed in the recycling optical cavity 60, the test material 70 is configured to emit a second light 13 having at least a second wavelength in response to a stimulus.

In some embodiments, the stimulus includes an optical stimulus, such that in response to the light 10 emitted by the backlight 200 having the at least the first wavelength, the test material 70 emits the second light 13 having the at least the second wavelength. In some embodiments, the test material 70 may absorb at least a portion of the light 10 emitted by the backlight 200 having the at least the first wavelength, and emit the emitted second light 13 having the at least the second wavelength.

In some embodiments, at least one of the first and second wavelengths is between about 420 nanometer (nm) and about 700 nm. In other words, at least one of the first and second wavelengths may lie in a visible wavelength range. In some embodiments, at least one of the first and second wavelengths is less than about 420 nm. In other words, at least one of the first and second wavelengths may lie in an ultraviolet range. In some embodiments, at least one of the first and second wavelengths is greater than about 700 nm. In other words, at least one of the first and second wavelengths may lie in an infrared range.

In some embodiments, the test material 70 may include a photoluminescent material. The photoluminescent material absorbs a photon, excites one of its electrons to a higher electronic excited state, and then radiates a photon as the electron returns to a lower energy state. In other words, the photoluminescent material emits a light after absorption of photons of an incident light. Such a phenomenon is known as photoluminescence. Generally, an emitted light has a wavelength different from a wavelength of an incident light.

In some embodiments, the photoluminescent material may include quantum dots. When a quantum dot is irradiated with an incident light, electrons in the quantum dot are excited to a higher state, and on return of the electrons to an original state, an excess energy possessed by the electrons is released as an emitted light. Wavelength of the emitted light depends on wavelength of the incident light and an energy gap between the original state and the higher state. The energy gap, in turn, depends on a size of the quantum dot. By varying the size of the quantum dot, for a given wavelength of the incident light, wavelength of the emitted light may be controlled. In some embodiments, quantum dots may be used for down-conversion fluorescence or for up-conversion fluorescence.

In some embodiments, the photoluminescent material may include one or more of a fluorescent material and a phosphorescent material. When subjected to an incident light, the fluorescent material exhibits fluorescence, and the phosphorescent material exhibits phosphorescence. Fluorescence may be relatively a fast process, and some amount of energy may be dissipated or absorbed during the process so that re-emitted light has an energy different from the absorbed incident light. In phosphorescence, the phosphorescent material may not immediately re-emit the absorbed incident light. Phosphorescence is emission of light from triplet-excited states, in which the electron in the excited orbital has the same spin orientation as the ground-state electron. Transitions to the ground state are spin-forbidden, and the emission rates are relatively slow. The result may be a slow process of radiative transition back to the singlet state, sometimes lasting from milliseconds to seconds to minutes.

In some embodiments, the at least the first wavelength may be lesser than the at least the second wavelength. In other words, the first wavelength of the light 10 may be lesser than the at least the second wavelength of the emitted second light 13. Thus, an energy of the light 10 is greater than an energy of the emitted second light 13. Such a phenomenon may be referred to as down-conversion fluorescence. When the test material 70 exhibits down-conversion fluorescence, an amount of energy may be absorbed by the test material 70 during fluorescence, such that the emitted second light 13 has a lower energy than the light 10.

In some other embodiments, the at least the first wavelength may be greater than the at least the second wavelength. In other words, the first wavelength of the light 10 may be greater than the at least the second wavelength of the emitted second light 13. Thus, an energy of the light 10 may be lower than an energy of the emitted second light 13. Such a phenomenon may be referred to as up-conversion fluorescence, where the test material 70 may absorb the light 10 and may emit the second light 13 such that the emitted second light 13 has a higher energy than the light 10.

In some embodiments, the stimulus includes a chemical stimulus, such that, in response to a chemical reaction, the test material 70 emits the second light 13 having the at least the second wavelength. In some embodiments, the chemical stimulus may be provided to the test material 70 along with the optical stimulus.

In some embodiments, the stimulus includes a kinetic stimulus, such that, in response to receiving a kinetic energy, the test material 70 emits the second light 13 having the at least the second wavelength. In some embodiments, the kinetic stimulus may be provided to the test material 70 along with the optical stimulus.

In some embodiments, the stimulus includes a thermal stimulus, such that, in response to receiving a thermal energy, the test material 70 emits the second light 13 having the at least the second wavelength. In some embodiments, the thermal stimulus may be provided to the test material 70 along with the optical stimulus.

In some embodiments, the stimulus includes an electrical stimulus, such that, in response to receiving an electrical energy, the test material 70 emits the second light 13 having the at least the second wavelength. In some embodiments, the electrical stimulus may be provided to the test material 70 along with the optical stimulus.

In some embodiments, the stimulus includes an electromagnetic stimulus, such that, in response to receiving an electromagnetic energy, the test material 70 emits the second light 13 having the at least the second wavelength. In some embodiments, the electromagnetic stimulus may be provided to the test material 70 along with the optical stimulus.

In some embodiments, the stimulus includes a biological stimulus. In some embodiments, the biological stimulus includes one or more of an enzyme and an antigen. In some embodiments, the biological stimulus includes a nucleic acid. In some embodiments, the biological stimulus may be provided to the test material 70 along with the optical stimulus.

The test material 70 may emit the second light 13, in response to the stimulus, in all directions. Specifically, the test material 70 may emit the second light 13 towards the front and back reflectors 50, 40. The emitted second light 13 exits the optical system 300 through the at least one opening 51 of the front reflector 50 after being recycled in the recycling optical cavity 60. The emitted second light 13 exiting the optical system 300 may be referred to as an "exiting light 14".

In some embodiments, the optical system 300 includes an optical detector 130 for receiving and detecting the emitted second light 13. Specifically, in some embodiments, the optical detector 130 receives and detects the exiting light 14. In some embodiments, the optical detector 130 is pixelated, and includes a plurality of sensor elements 131. For example, the optical detector 130 may include a charge-coupled device (CCD) or an active-pixel sensor (e.g., a CMOS sensor). In some other embodiments, the optical detector 130 may be a human eye.

Figure 2:
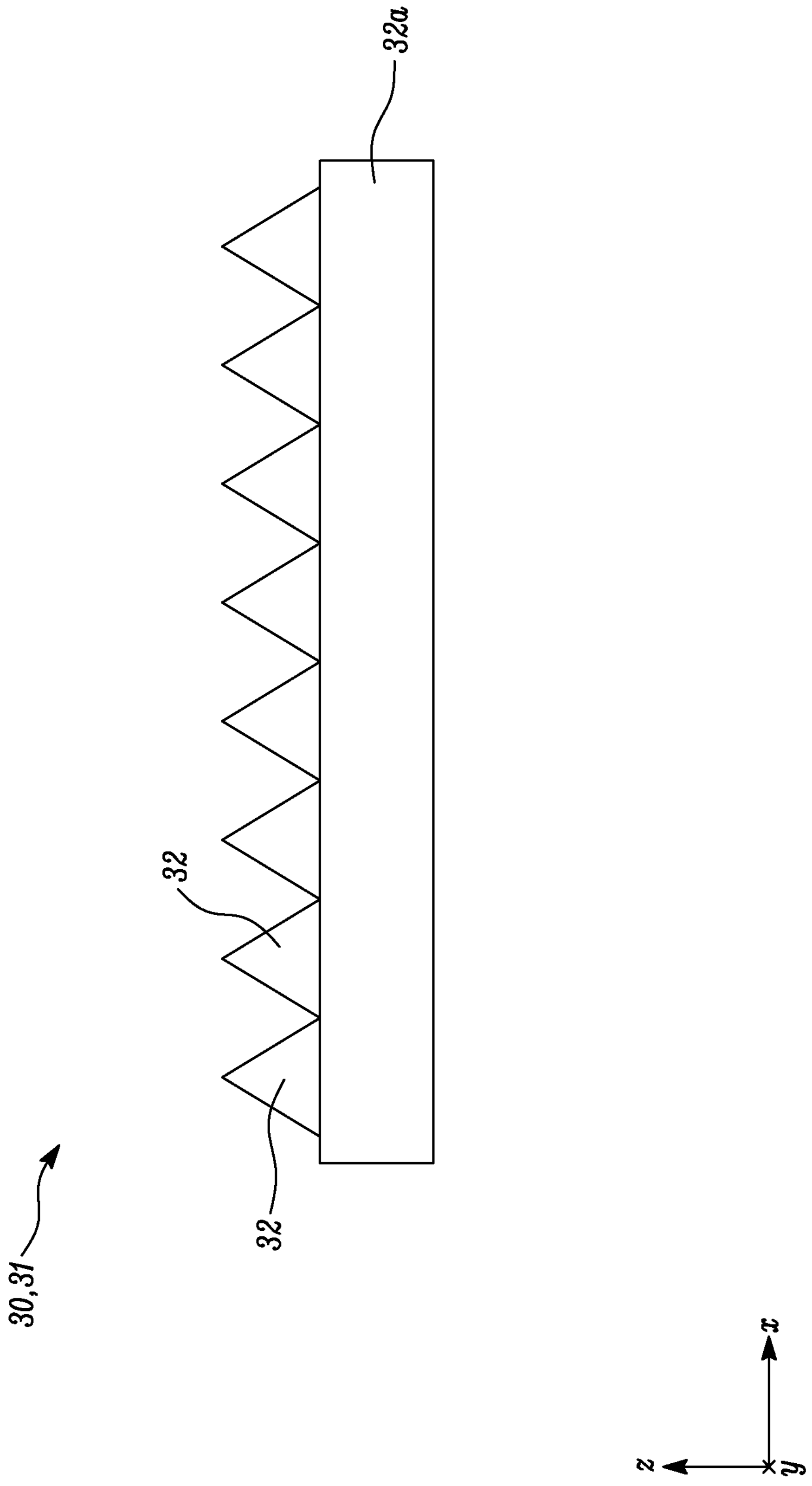
FIG. 2 illustrates a detailed schematic sectional view of a light redirecting film of the backlight of FIG. 1A, according to an embodiment of the present disclosure.

FIG. 2 illustrates a detailed schematic sectional view of the at least one light redirecting film 30, 31, according to an embodiment of the present disclosure. In some embodiments, the at least one light redirecting film 30, 31 includes a plurality of prisms 32. In some embodiments, the plurality of prisms 32 are disposed on a substrate layer 32*a*.

The at least one light redirecting film 30, 31 including the plurality of prisms 32 may be configured to redirect a light incident on the at least one light redirecting film 30, 31 along a desired direction. The at least one light redirecting film 30, 31 including the plurality of prisms 32 may redirect the light incident on the at least one light redirecting film 30, 31 by refracting a portion of the light incident on the light redirecting film 30, 31. Generally, the at least one light redirecting film 30, 31 is used in a display device, such as a liquid crystal display, to improve a brightness of the display device.

Figure 3:
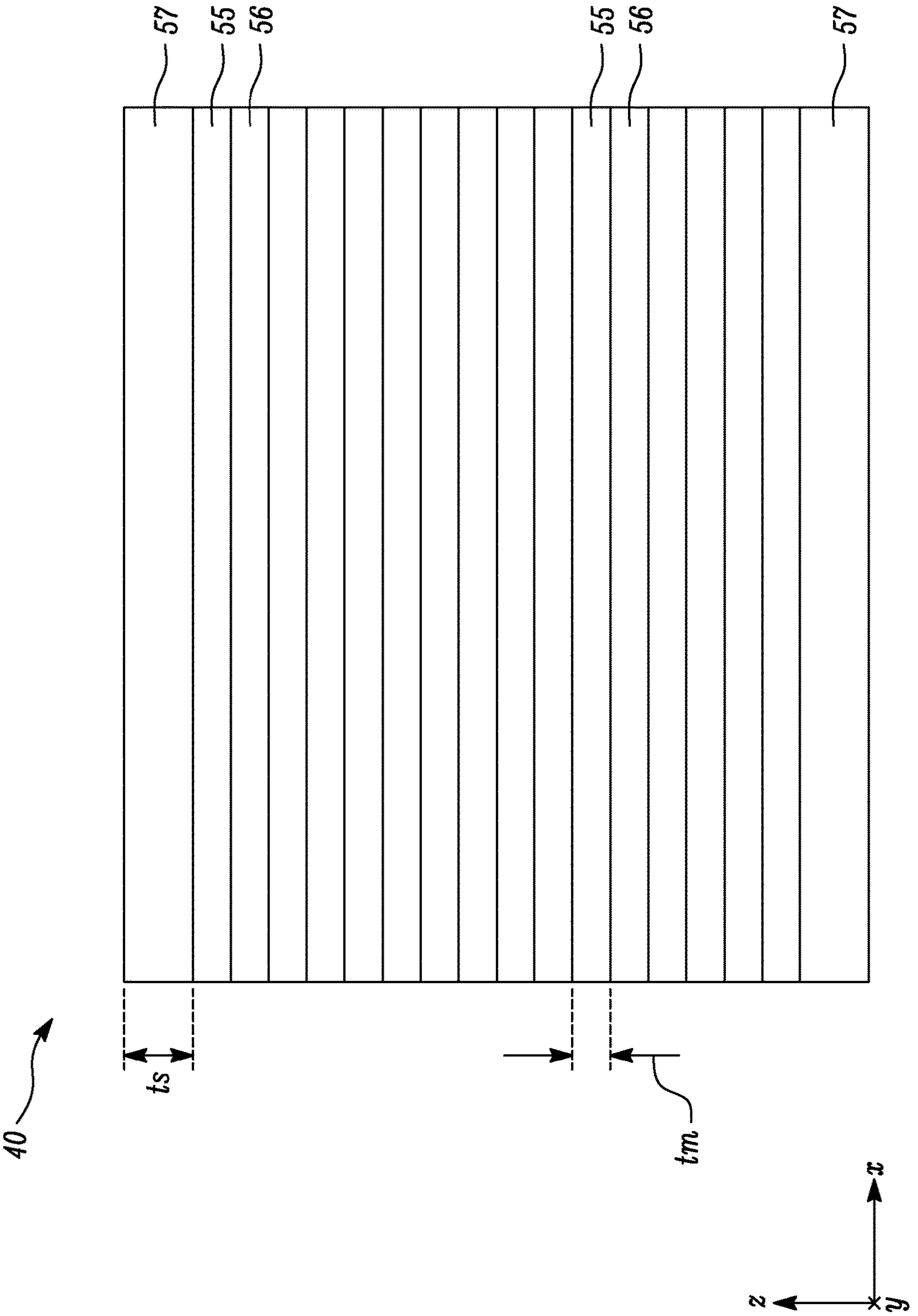
FIG. 3 illustrates a detailed schematic sectional view of a back reflector, according to an embodiment of the present disclosure.

FIG. 3 illustrates a detailed schematic sectional view of the back reflector 40 of the backlight 200 (shown in FIG. 1), according to an embodiment of the present disclosure.

In some embodiments, the back reflector 40 includes a plurality of microlayers 55, 56. In the illustrated embodiment of FIG. 3, the back reflector includes a plurality of alternating first and second microlayers 55, 56. In some embodiments, the plurality of microlayers 55, 56 are disposed adjacent to each other along the z-axis. In some embodiments, the plurality of microlayers 55, 56 number at least 20 in total. In some embodiments, the plurality of microlayers 55, 56 number at least 50, at least 100, at least 150, at least 200, or at least 250 in total.

The plurality of microlayers 55, 56 may be interchangeably referred to as "the microlayers 55, 56". In some embodiments, each of the microlayers 55, 56 has an average thickness tm. The average thickness tm is defined along the z-axis of each of the microlayers 55, 56. The term "average thickness", as used herein, refers to an average of thicknesses measured at multiple points across a plane (i.e., the x-y plane) of each of the microlayers 55, 56. In some embodiments, each of the microlayers 55, 56 has the average thickness tm of less than about 500 nm. In some embodiments, each of the microlayers 55, 56 has the average thickness tm of less than about 450 nm, less than about 400 nm, less than about 350 nm, less than about 300 nm, less than about 250 nm, or less than about 200 nm.

In some embodiments, the back reflector 40 further includes at least one skin layer 57. The at least one skin layer 57 has an average thickness ts. The average thickness ts is defined along the z-axis of the at least one skin layer 57. In some embodiments, the at least one skin layer 57 has the average thickness ts of greater than about 500 nm. In some embodiments, the at least one skin layer 57 has the average thickness ts of greater than about 750 nm, greater than about 1000 nm, greater than about 1500 nm, or greater than about 2000 nm.

The at least one skin layer 57 may act as a protective layer for the for the plurality of microlayers 55, 56. In the illustrated embodiment of FIG. 3, the back reflector 40 includes a pair of opposing skin layers 57. The skin layers 57 of the back reflector 40 of FIG. 3 may act as protective boundary layers (PBL).

Referring to FIGS. 1A and 3, in some embodiments, the reflective polarizer 80 may be substantially similar in construction to the back reflector 40. In some embodiments, the reflective polarizer 80 includes the plurality of microlayers 55, 56 numbering at least 20 in total, each of the microlayers 55, 56 having the average thickness tm of less than about 500 nm.

In some embodiments, the front reflector 50 may also be substantially similar in construction to the back reflector 40. In some embodiments, the front reflector 50 includes the plurality of microlayers 55, 56 numbering at least 20 in total, each of the microlayers 55, 56 having the average thickness tm of less than about 500 nm. In some embodiments, the front reflector 50 further includes the at least one skin layer 57 having the average thickness ts of greater than about 500 nm.

In some embodiments, at least one of the front and back reflectors 50, 40 includes the plurality of microlayers 55, 56 numbering at least 20 in total, each of the microlayers 55, 56 having the average thickness tm of less than about 500 nm. In some embodiments, at least one of the front and back reflectors 50, 40 further includes the at least one skin layer 57 having the average thickness ts of greater than about 500 nm.

In some embodiments, at least one of the front and back reflectors 50, 40 includes a metal layer (not shown). In some embodiments, the metal layer includes one or more of silver, gold, aluminum, and titanium. Further, in some embodiments, the metal layer has an average thickness of between about 50 nm and about 1000 nm.

Figure 4B:
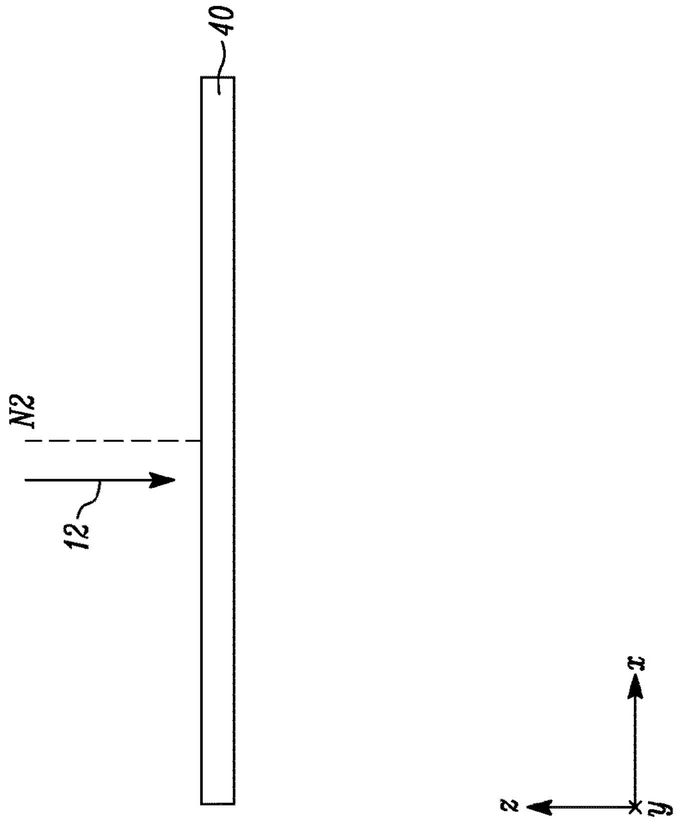
FIG. 4B illustrates a schematic sectional view of the back reflector of FIG. 3, according to an embodiment of the present disclosure.
Figure 4A:
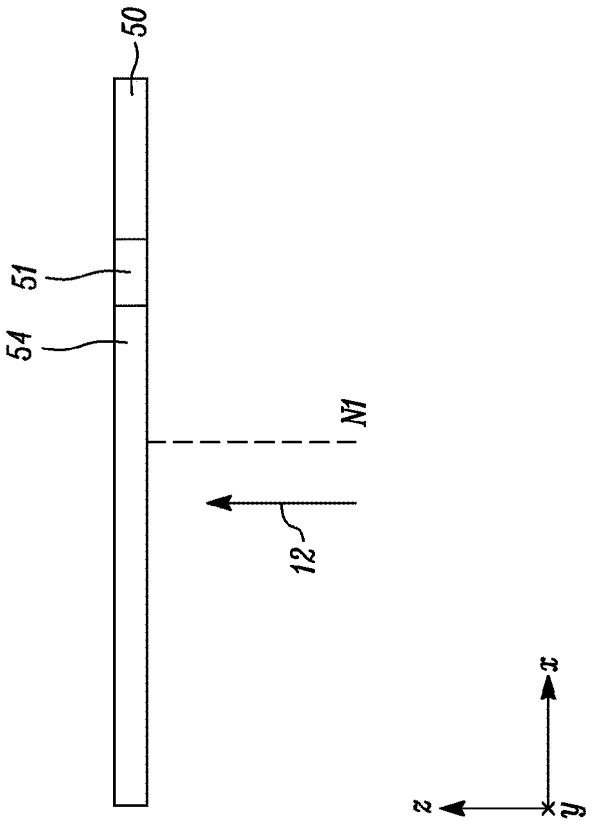
FIG. 4A illustrates a schematic sectional view of the front reflector of FIG. 1A, according to an embodiment of the present disclosure.

FIG. 4A illustrates a schematic sectional view of the front reflector 50 of the optical system 300 (shown in FIG. 1A), according to an embodiment of the present disclosure. FIG. 4A further illustrates a substantially normally incident light 12 incident on the front reflector 50, i.e., the substantially normally incident light 12 is incident at an angle of about 0 degree with respect to a normal N1 to the front reflector 50. In some embodiments, the normal N1 may be substantially along the z-axis of the optical system 300. The substantially normally incident light 12 may be interchangeably referred to as "the incident light 12".

For the incident light 12, the at least the first region 54 of the front reflector 50 adjacent the at least one opening 51 reflects at least 60% of the incident light 12 for each of the at least the first wavelength and the different at least the second wavelength. In some embodiments, for the incident light 12, the at least the first region 54 of the front reflector 50 adjacent the at least one opening 51 reflects at least 70%, at least 80%, at least 90%, at least 95%, or at least 99% of the incident light 12 for each of the at least first wavelength and the different at least the second wavelength. In other words, for the incident light 12, the at least the first region 54 of the front reflector 50 adjacent the at least one 51 substantially reflects the incident light 12 for each of the at least first wavelength and the different at least the second wavelength.

For the incident light 12, the at least one opening 51 and the at least first region 54 of the front reflector 50 have respective optical transmittances T1 and T2 at the at least the second wavelength. T1 is greater than T2 by a factor of about 1.2, i.e., T1>1.2 T2. In some embodiments, T1>1.5 T2, T1>2 T2, T1>5 T2, T1>10 T2, T1>50 T2, or T1>100 T2. Therefore, the at least one opening 51 has the optical transmittance T1 at the at least the second wavelength substantially greater than the optical transmittance T2 of the at least first region 54 at the at least the second wavelength.

In some embodiments, for the incident light 12 and for each of the first and second wavelengths, the at least one opening 51 transmits at least 60% of the incident light 12. In some embodiments, for the incident light 12 and for each of the first and second wavelengths, the at least one opening 51 transmits at least 70%, at least 80%, or at least 90% of the incident light 12.

FIG. 4B illustrates a schematic sectional view of the back reflector 40 of the optical system 300 (shown in FIG. 1A), according to an embodiment of the present disclosure. FIG. 4B further illustrates the incident light 12 incident on the back reflector 40, i.e., the substantially normally incident light 12 is incident at an angle of about 0 degree with respect to a normal N2 to the back reflector 40. In some embodiments, the normal N2 may be substantially along the z-axis of the optical system 300 and substantially parallel to the normal N1 (shown in FIG. 4A).

For the incident light 12, the back reflector 40 reflects at least 60% of the incident light 12 for each of the at least the first wavelength and the different at least the second wavelength. In some embodiments, for the incident light 12, the back reflector 40 reflects at least 70%, at least 80%, at least 90%, at least 95%, or at least 99% of the incident light 12 for each of the at least the first wavelength and the different at least the second wavelength. In other words, for the incident light 12, the back reflector 40 substantially reflects the incident light 12 for each of the at least the first wavelength and the different at least the second wavelength.

Referring now to FIGS. 4A and 4B, for the incident light 12, each of the back reflector 40 and the at least the first region 54 of the front reflector 50 adjacent the at least one opening 51 therefore reflects at least 60% of the incident light 12 for each of the at least the first wavelength and the different at least the second wavelength. In other words, for the incident light 12 and for each of the at least first and second wavelengths, each of the back reflector 40 and the at least first region 54 of the front reflector 50 adjacent the at least one opening 51 reflects at least 60% of the incident light 12.

Thus, the back reflector 40 and the at least the first region 54 of the front reflector 50 adjacent the at least one opening 51 may substantially reflect each of the first light 11 having the at least the first wavelength and the second light 13 having the at least the second wavelength within the recycling optical cavity 60 (shown in FIG. 1).

Referring now to FIGS. 1A, 4A and 4B, the emitted second light 13 is recycled in the recycling optical cavity 60 defined between the back reflector 40 and the front reflector 50. Specifically, the emitted second light 13 is recycled due to multiple reflections of the emitted second light 13 between the back reflector 40 and the at least the first region 54 of the front reflector 50. The emitted second light 13 is recycled until the emitted second light 13 exits the optical system 300 as the exiting light 14 through the at least one opening 51 of the front reflector 50, which may have a substantially greater optical transmittance T1 than the optical transmittance T2 of at least the first region 54 of the front reflector 50.

The recycling affects an optical intensity of the exiting light 14. In some embodiments, the recycling increases the optical intensity of the exiting light 14. In some embodiments, the recycling decreases the optical intensity of the exiting light 14. Therefore, the optical system 300 may improve or enhance the optical intensity of the exiting light 14 for detection of the emitted second light 13 by the optical detector 130.

Since the back reflector 40 and the at least the first region 54 of the front reflector 50 adjacent the at least one opening 51 may also substantially reflect the first light 11, the first light 11 may also be recycled in the recycling optical cavity 60. The recycling of the first light 11 within the recycling optical cavity 60 may ensure that the test material 70 is adequately exposed to the stimulus, i.e., the first light 11. This may allow better utilization of the first light 11. Further, the recycling of the first light 11 may also affect an optical intensity of the first light 11. Therefore, the test material 70 may receive the first light 11 having an improved optical intensity.

Figure 5:
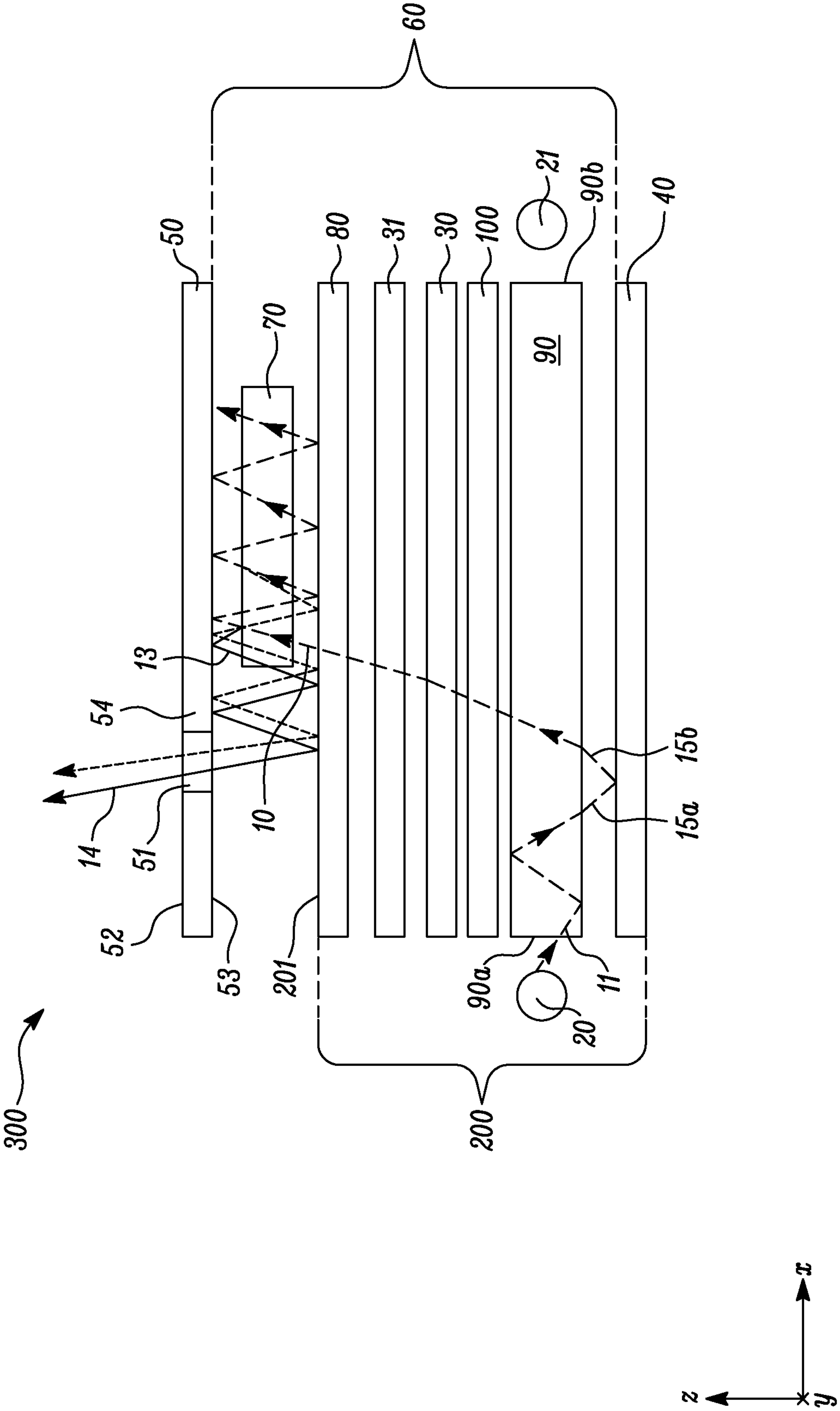
FIG. 5 illustrates a detailed schematic sectional view of an optical system, according to another embodiment of the present disclosure.

FIG. 5 illustrates another detailed schematic sectional view of the optical system 300. As illustrated in FIG. 5, the first light 11 is reflected from the front reflector 50 towards the reflective polarizer 80. Further, the emitted second light 13 is also reflected from the front reflector 50 towards the reflective polarizer 80. The reflective polarizer 80 may reflect a light incident on the reflective polarizer 80 for each of the at least first and second wavelengths. Therefore, the first light 11 may further recycle between the front reflector 50 and the reflective polarizer 80. Further, the emitted second light 13 emitted by the test material 70 in response to the stimulus may also recycle between the front reflector 50 and the reflective polarizer 80. The first light 11 and the emitted second light 13 may recycle between the front reflector 50 and the reflective polarizer 80 in addition to recycling in the recycling optical cavity 60. This may further affect the optical intensity of the exiting light 14.

Figure 6:
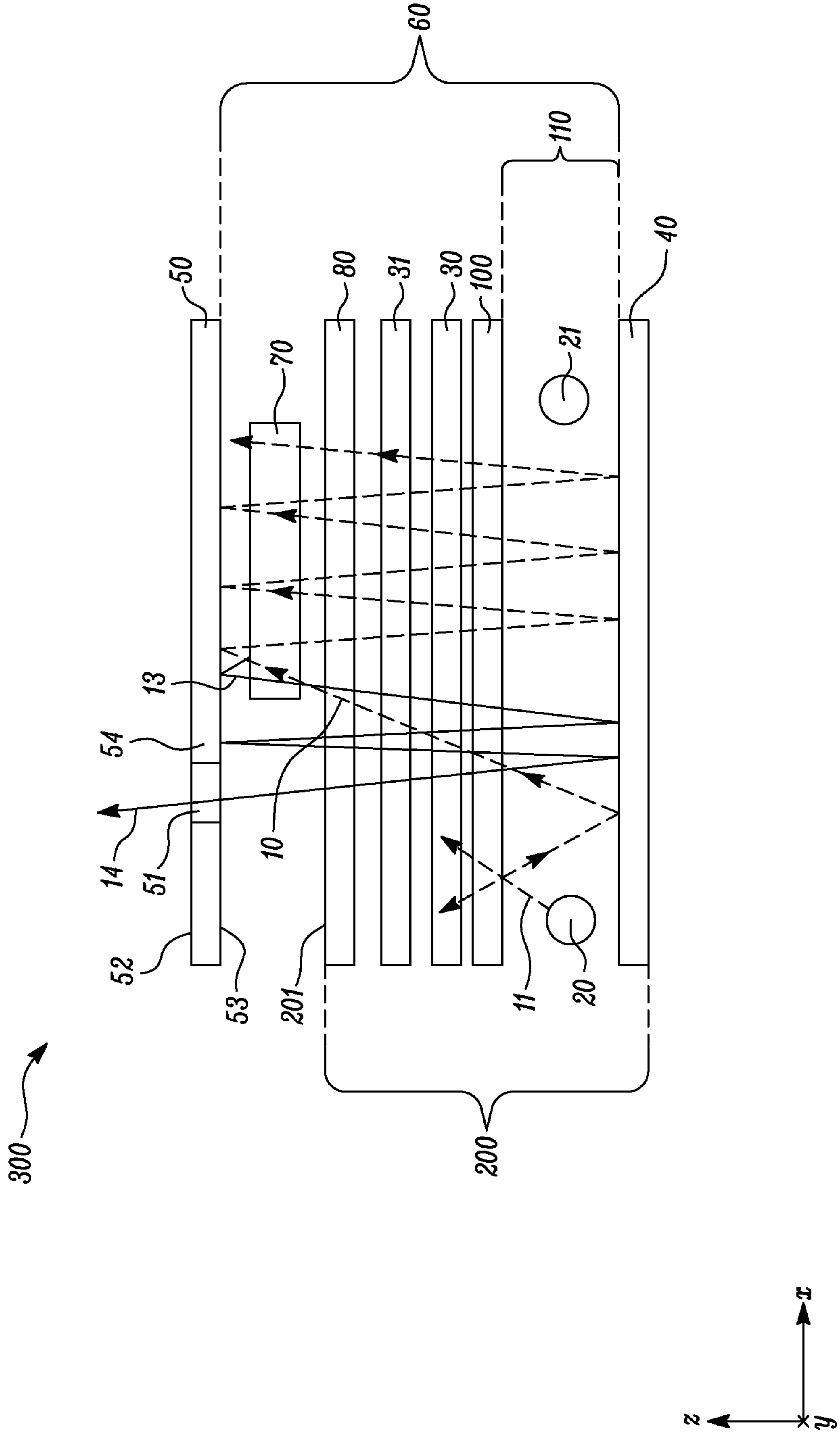
FIG. 6 illustrates a detailed schematic sectional view of an optical system, according to another embodiment of the present disclosure.

FIG. 6 illustrates a detailed schematic sectional view of the optical system 300, according to another embodiment of the present disclosure. The optical system 300 of FIG. 6 may be substantially similar to the optical systems 300 shown in FIGS. 1A and 5, however, in the illustrated embodiment of FIG. 6, the backlight 200 of the optical system 300 has a backlit configuration. In such embodiments, the at least one light source 20, 21 is disposed in the backlight recycling cavity 110. Further, in the illustrated embodiment of FIG. 6, the optical system 300 does not include the lightguide 90 (shown in FIGS. 1A and 5). However, in some other embodiments, the optical system 300 having the backlit configuration may include the lightguide 90.

Figure 7:
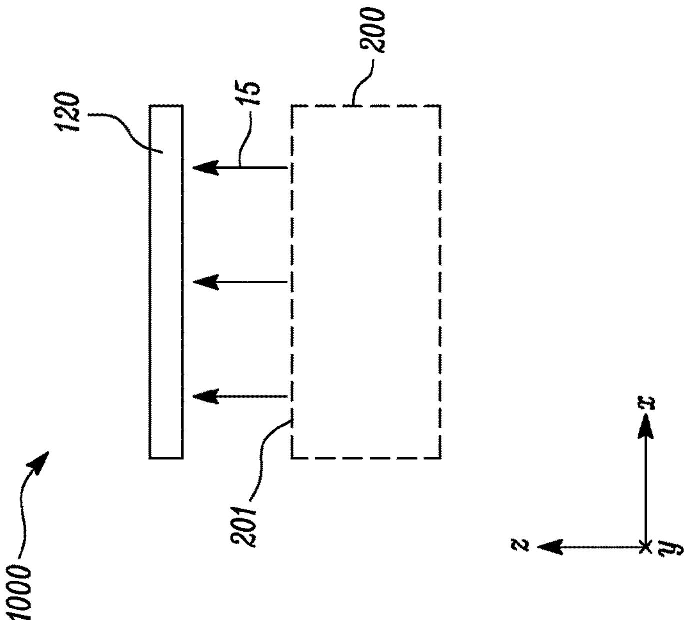
FIG. 7 illustrates a schematic sectional view of a display device, according to an embodiment of the present disclosure.

FIG. 7 illustrates a schematic sectional view of a display device 1000, according to an embodiment of the present disclosure.

The display device 1000 may include the backlight 200 of FIG. 1A or FIG. 6. The backlight 200 is configured to provide substantially polarized uniform illumination 15 to a display panel 120 through the emission surface 201 thereof. In some embodiments, an optical intensity of the substantially polarized uniform illumination 15 to the display panel 120 varies less than about 20% across the emission surface 201. In some embodiments, the optical intensity of the substantially polarized uniform illumination 15 to the display panel 120 varies less than about 15%, less than about 10%, or less than about 5% across the emission surface 201.

In some embodiments, the substantially polarized uniform illumination 15 to the display panel 120 includes a first illumination portion polarized along a first direction. In some embodiments, the substantially polarized uniform illumination 15 to the display panel 120 includes a second illumination portion polarized along an orthogonal second direction. In some embodiments, the first and second directions are parallel to the emission surface 201. In other words, the first and second directions are parallel to the x-y plane. In some embodiments, the first direction is along the x-axis. In some embodiments, the orthogonal second direction is along the y-axis.

In some embodiments, a ratio of the first illumination portion to the second illumination portion is greater than about 10. In other words, the substantially polarized uniform illumination 15 may include a greater amount of the first illumination portion as compared to the second illumination portion. In other words, the substantially polarized uniform illumination 15 is substantially polarized along the first direction. In some embodiments, the ratio of the first illumination portion to the second illumination portion is greater than about 50, greater than about 100, greater than about 500, or greater than about 1000.

Figure 8:
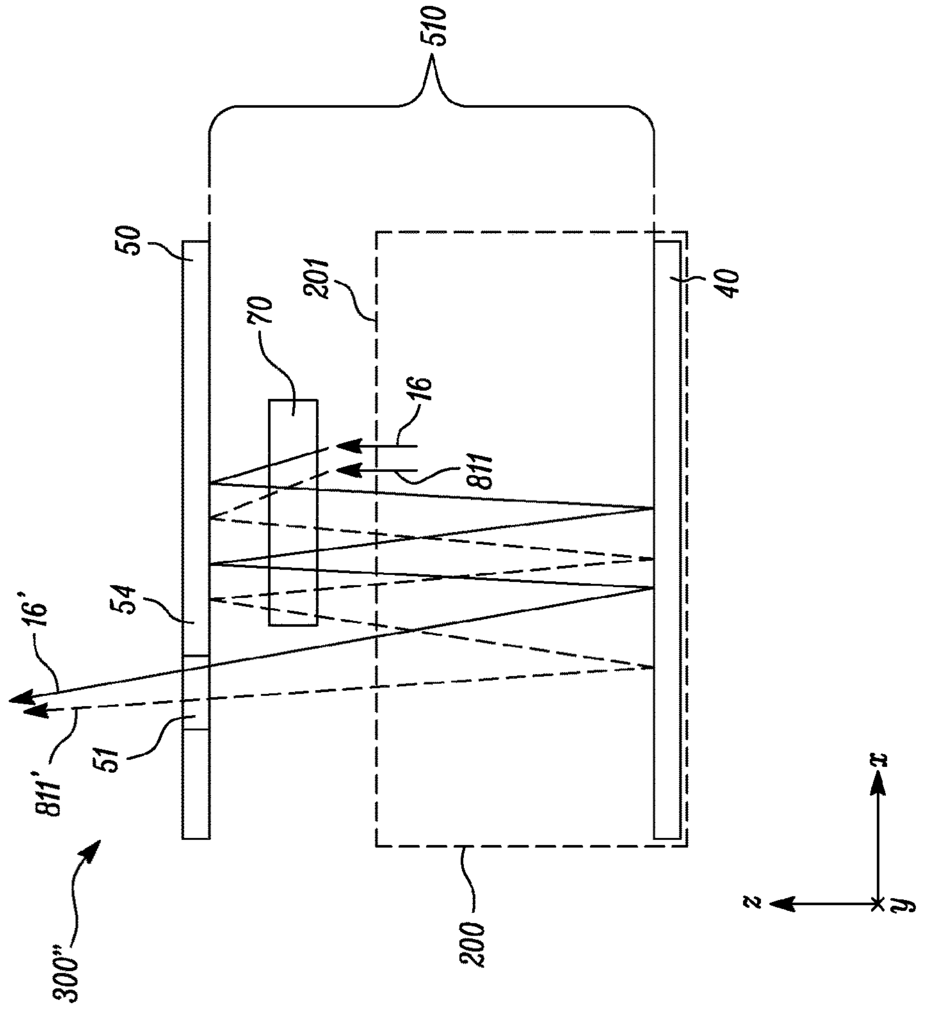
FIG. 8 illustrates a detailed schematic sectional view of an optical system, according to another embodiment of the present disclosure.

FIG. 8 illustrates a detailed schematic sectional view of an optical system 300", according to another embodiment of the present disclosure. The optical system 300" includes the backlight 200 shown in FIG. 7. Specifically, the optical system 300" includes the backlight 200 of the display device 1000 shown in FIG. 7. In some embodiments, the display panel 120 of the display device 1000 may be removed from the display device 1000 in order to use the backlight 200 in the optical system 300". In some other embodiments, the display panel 120 of the display device 1000 may not be removed from the display device 1000 in order to use the backlight 200 in the optical system 300".

As discussed above, the backlight 200 is configured to provide the substantially polarized uniform illumination 15 (shown in FIG. 7) through the emission surface 201 thereof. The backlight 200 further includes the back reflector 40. The back reflector 40 is substantially co-extensive in the length L and the width W (shown in FIG. 1B) with the emission surface 201.

The substantially polarized uniform illumination 15 includes at least a first light 811 having the at least the first wavelength and a second light 16 having the at least the second wavelength. In some embodiments, the substantially polarized uniform illumination 15 includes the first and second lights 811, 16 in substantially equal proportions. In some embodiments, the substantially polarized uniform illumination 15 includes the first and second lights 811, 16 in different proportions.

The optical system 300" further includes the front reflector 50 disposed on the backlight 200. The front and back reflectors 50, 40 define a recycling optical cavity 510 therebetween. The test material 70 is shown disposed in the recycling optical cavity 510. When the test material 70 is disposed in the recycling optical cavity 510, the test material 70 may be configured to absorb light at each of the first and second wavelengths. In other words, the test material 70 may be configured to absorb both the first and second lights 811, 16 of the substantially polarized uniform illumination 15.

The first and second lights 811, 16 from the backlight 200 exit the optical system 300" through the at least one opening 51 of the front reflector 50 after being recycled in the recycling optical cavity 510. The first and second lights 811, 16 exit the optical system 300" through the at least one opening 51 of the front reflector 50 after being recycled in the recycling optical cavity 510 as exiting lights 811', 16', respectively. The recycling enhances a ratio of an optical intensity of one of the first and second lights 811, 16 to an optical intensity of the other of the first and second lights 811, 16. Therefore, a ratio of an optical intensity of one of the exiting lights 811', 16' to an optical intensity of the other of the exiting lights 811', 16' may be enhanced within the recycling optical cavity 510 due to recycling. Consequently, in some cases, the recycling may enhance or improve a contrast of the exiting lights 811', 16'. In some embodiments, the front and back reflectors 50, 40 may be substantially coextensive with each other in length and width. This may further improve the recycling and in turn, further enhance the contrast.

Figure 9A:
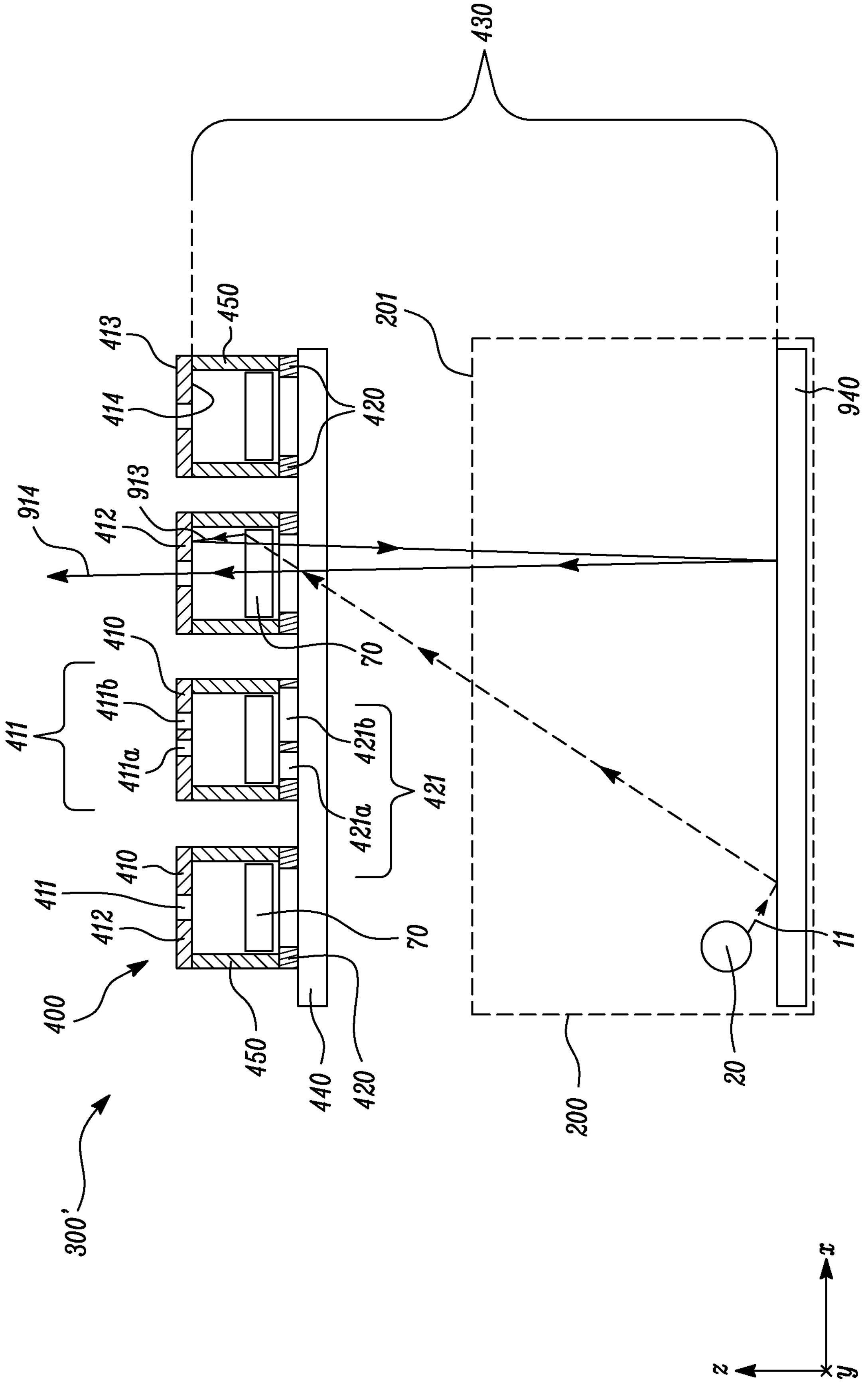
FIG. 9A illustrates a detailed schematic sectional view of an optical system, according to another embodiment of the present disclosure.

FIG. 9A illustrates a detailed schematic sectional view of an optical system 300', according to another embodiment of the present disclosure.

The optical system 300' includes the backlight 200 shown in FIG. 7. Specifically, the backlight 200 is configured to provide the substantially polarized uniform illumination 15 through the emission surface 201 thereof. Specifically, the optical system 300' includes the backlight 200 of the display device 1000 shown in FIG. 7. In some embodiments, the display panel 120 of the display device 1000 may be removed from the display device 1000 in order to use the backlight 200 in the optical system 300'. In some other embodiments, the display panel 120 of the display device

1000 may not be removed from the display device 1000 in order to use the backlight 200 in the optical system 300'.

The backlight 200 is configured to emit the first light 11 having the first wavelength from the emission surface 201 thereof. In some embodiments, the backlight 200 includes the first light source 20 configured to emit the first light 11 having at least the first wavelength.

The optical system 300' may interchangeably be referred to as the optical construction 300'. The optical construction 300' includes a bottom reflector 940. The bottom reflector 940 is substantially co-extensive in the length L and the width W (shown in FIG. 1B) with the emission surface 201.

The optical construction 300' further includes a top reflector 410 disposed on the bottom reflector 940. The optical construction 300' further includes a middle reflector 420 disposed between the top and bottom reflectors 410, 940. In some embodiments, the optical construction 300' is disposed on the emission surface 201 of the backlight 200 so that the emission surface 201 is disposed between the middle and bottom reflectors 420, 940.

In some embodiments, at least one of the top, middle and bottom reflectors 410, 420, 940 are substantially similar in construction to the back reflector 40 (described in FIG. 3). In some embodiments, at least one of the top, middle and bottom reflectors 410, 420, 940 includes the plurality of microlayers 55, 56 numbering at least 20 in total, each of the microlayers 55, 56 having the average thickness tm of less than about 500 nm. Further, in some embodiments, the at least one of the top, middle and bottom reflectors 410, 420, 940 includes the at least one skin layer 57 having the average thickness ts of greater than about 500 nm.

The top reflector 410 defines therein a plurality of spaced apart groups of one or more top openings 411. Further, the middle reflector 420 defines therein a plurality of spaced apart middle groups of one or more middle openings 421. The top and middle groups 411, 421 are in a one-to-one correspondence with each other. In FIG. 9A, for example, the top reflector 410 defines a group of top openings 411*a*, 411*b* and a corresponding group of middle openings 421*a*, 421*b*.

For each of the corresponding groups of the one or more top and middle openings 411, 421, a total area A1 of the top openings 411 is less than a total area A2 of the middle openings 421. For example, a total area A1 of the top openings 411*a*, 411*b* is less than a total area A2 of the middle openings 421*a*, 421*b*.

In some embodiments, the total area A1 of the top openings 411 is less than the total area A2 of the middle openings 421 by at least 10%. In some embodiments, the total area A1 of the top openings 411 is less than the total area A2 of the middle openings 421 by at least 20%, by at least 30%, by at least 40%, by at least 50%, or by at least 75%.

Further, for each of the corresponding groups of the one or more top and middle openings 411, 421, the one or more top and middle openings 411, 421 are configured to receive the test material 70 therebetween. The test material 70 is configured to emit a signal light 913 having a signal wavelength in response to the stimulus. In some embodiments, the stimulus includes light at the first wavelength, so that the test material 70 is configured to emit the signal light 913 having the signal wavelength in response to at least being illuminated by the emitted first light 11 having the first wavelength.

For a substantially normally incident light (e.g., the incident light 12 shown in FIG. 4A) having the signal wavelength, each of the top, middle and bottom reflectors 410, 420, 940 has the optical reflectance of at least 60%. In some embodiments, for the substantially normally incident light having the signal wavelength, each of the top, middle and bottom reflectors 410, 420, 940 has the optical reflectance of at least 70%, at least 80%, at least 90%, at least 95%, or at least 99%. Therefore, each of the top, middle and bottom reflectors 410, 420, 940 may substantially reflect the signal light 913 having the signal wavelength.

Further, for the substantially normally incident light having the signal wavelength, each of the top and middle openings 411, 421 has the optical transmittance of at least 60%. In some embodiments, for the substantially normally incident light having the signal wavelength, each of the top and middle openings 411, 421 has the optical transmittance of at least 70%, at least 80%, at least 90%, at least 95%, or at least 99%. Therefore, each of the top and middle openings 411, 421 may substantially transmit the signal light 913 having the signal wavelength.

In some embodiments, the optical system 300' includes a plurality of optical cells 400 disposed on, and arranged across the emission surface 201. In some embodiments, the optical cells 400 in the plurality of optical cells 400 are disposed on and supported by a substrate 440. In some embodiments, the substrate 440 may be the display panel 120 (shown in FIG. 7).

The top and middle reflectors 410, 420 may be interchangeably referred to as "the top wall 410" and the "the bottom wall 420", respectively. Further, the top and middle openings 411, 421 may be interchangeably referred to as the "output window 411" and the "input window 421", respectively.

Each of the optical cells 400 includes the top wall 410 disposed on, and spaced apart from, the emission surface 201. In some embodiments, the top wall 410 defines opposing first and second outermost major surfaces 413, 414. In some embodiments, the second outermost major surface 414 faces the emission surface 201. The top wall 410 defines the at least one output window 411 therein. In some embodiments, the at least one output window 411 includes a physical through opening extending from the first outermost major surface 413 of the top wall 410 to the opposite second outermost major surface 414 of the top wall 410.

The at least one output window 411 has the total area A1, and is surrounded by a remaining portion 412 of the top wall 410. In some embodiments, A1 is less than about 30% of an area of the top wall 410. In some embodiments, A1 is less than about 25%, less than about 20%, less than about 15%, less than about 10%, or less than about 5% of the area of the top wall 410.

In some embodiments, each of the optical cells 400 further includes the bottom wall 420 disposed between the top wall 410 and the emissions surface 201. The bottom wall 420 defines the at least one input window 421 therein having the total area A2. In some embodiments, the total area A2 of the at least one input window 421 is greater than the total area A1 of the at least one output window 411, i.e., A2>A1. In some embodiments, A2 is greater than A1 by at least 10%. In some embodiments, A2 is greater than A1 by at least 20%, at least 30%, at least 40%, or at least 50%.

In some embodiments, each of the optical cells 400 further includes one or more side walls 450 extending from the top wall 410 toward the emission surface 201. The one or more side walls 450 may have an optical reflectance similar to the top, middle and bottom reflectors 410, 420, 940. In some embodiments, for the substantially normally incident light having the signal wavelength, the one or more side walls 450 has the optical reflectance of at least 60%. In some embodiments, for the substantially normally incident light having the signal wavelength, the one or more side walls 450 has the optical reflectance of at least 70%, at least 80%, at least 90%, at least 95%, or at least 99%. Therefore, the one or more side walls 450 may substantially reflect the signal light 913 having the signal wavelength.

In some embodiments, the bottom wall 420 may be similar in construction to the back reflector 40 (described in FIG. 3). Therefore, the bottom wall 420 includes the plurality of microlayers 55, 56 numbering at least 20 in total, each of the microlayers 55, 56 having the average thickness tm of less than about 500 nm.

Further, in some embodiments, at least one of the one or more side walls 450 is similar in construction to the back reflector 40 (described in FIG. 3). Therefore, in some embodiments, the at least one of the one or more side walls 450 includes the plurality of microlayers 55, 56 numbering at least 20 in total, each of the microlayers 55, 56 having the average thickness tm of less than about 500 nm.

The top wall 410 and the bottom reflector 940 of the backlight 200 define an optical recycling cavity 430 therebetween.

In some embodiments, at least one of the bottom reflector 940 and the top wall 410 is similar in construction to the back reflector 40 (described in FIG. 3). In some embodiments, at least one of the bottom reflector 940 and the top wall 410 includes the plurality of microlayers 55, 56 numbering at least 20 in total, each of the microlayers 55, 56 having the average thickness tm of less than about 500 nm. Further, in some embodiments, the at least one of the bottom reflector 940 and the top wall 410 includes the at least one skin layer 57 having the average thickness ts of greater than about 500 nm.

In some embodiments, for the substantially normally incident light having the signal wavelength, each of the bottom reflector 940 and the remaining portion of the top wall 412 has the optical reflectance of at least 60%. In some embodiments, for the substantially normally incident light having the signal wavelength, each of the bottom reflector 940 and the remaining portion of the top wall 412 has the optical reflectance of at least 70%, at least 80%, at least 90%, at least 95%, or at least 99%.

For the substantially normally incident light having the signal wavelength, the at least one output window 411 has the optical transmittance of at least 60%. In some embodiments, for the substantially normally incident light having the signal wavelength, the at least one output window 411 has the optical transmittance of at least 70%, at least 80%, at least 90%, at least 95%, or at least 99%.

The optical cell 400 is configured to receive therein the test material 70 configured to emit the signal light 913 having the signal wavelength in response to the stimulus. The emitted signal light 913 exits the optical cell 400 through the at least one output window 411 after being recycled in the optical recycling cavity 430. In some embodiments, the emitted signal light 913 exits the optical cell 400 through the at least one output window 411 after being recycled between the top and bottom reflectors 410, 940. In some embodiments, the emitted signal light 913 exits the optical cell 400 through the at least one output window 411 after being recycled between the top, middle and bottom reflectors 410, 420, 940. In some embodiments, the emitted signal light 913 exits the optical cell 400 through the at least one output window 411 after being reflected by at least one of the one or more side walls 450. The emitted signal light 913 exiting the optical cell 400 may be referred to as an "exiting light 914". The recycling affects an optical intensity of the exiting light 914. In other words, the recycling may enhance the optical intensity of the exiting light 914. In some embodiments, the recycling increases the optical intensity of the exiting light 914. In some embodiments, the recycling decreases the optical intensity of the exiting light 914. Therefore, the optical system 300' may improve the optical intensity of the exiting light 914 for detection of the emitted signal light 913 by an optical detector (not shown).

In some embodiments, the test material 70 is configured to emit the signal light 913 having the signal wavelength in response to the stimulus, while the backlight 200 is turned off. In some embodiments, the stimulus may be at least one of the chemical stimulus, the kinetic stimulus, the thermal stimulus, the electrical stimulus, the electromagnetic stimulus, and the biological stimulus.

Figure 9B:
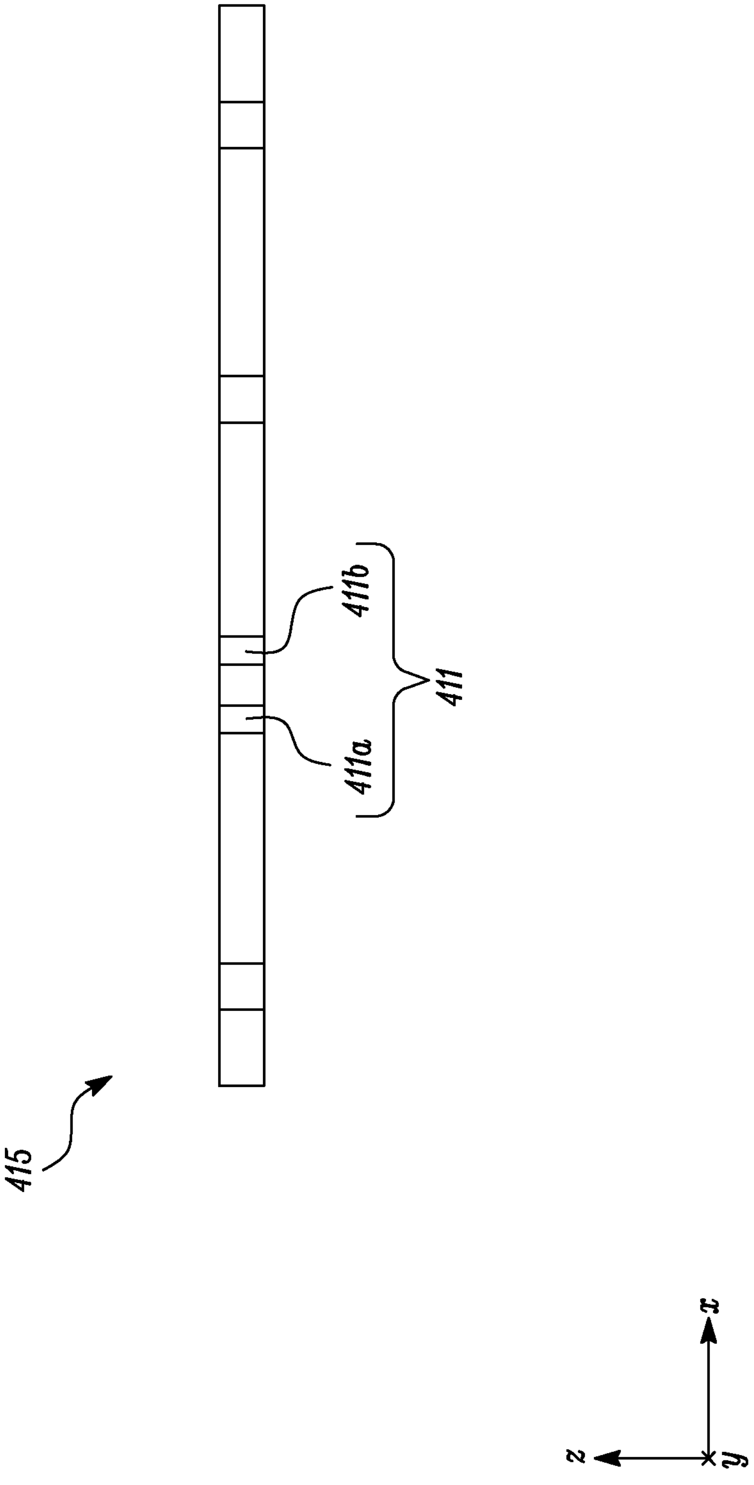
FIG. 9B illustrates a schematic sectional view of a continuous top wall, according to an embodiment of the present disclosure.

FIG. 9B illustrates a schematic sectional view of a continuous top wall 415 of the optical system 300' (shown in FIG. 9A), according to an embodiment of the present disclosure. Referring to FIGS. 9A and 9B, in some embodiments, the top walls 410 of the optical cells 400 are connected so as to form the continuous top wall 415. In some embodiments, the top reflector 410 is a continuous reflector (e.g., the continuous top wall 415). In some embodiments, the middle reflector 420 is a continuous reflector. Such a continuous reflector may be substantially similar to the continuous top wall 415. In some embodiments, at least one of the top and middle reflectors 410, 420 is the continuous reflector.

Figure 10:
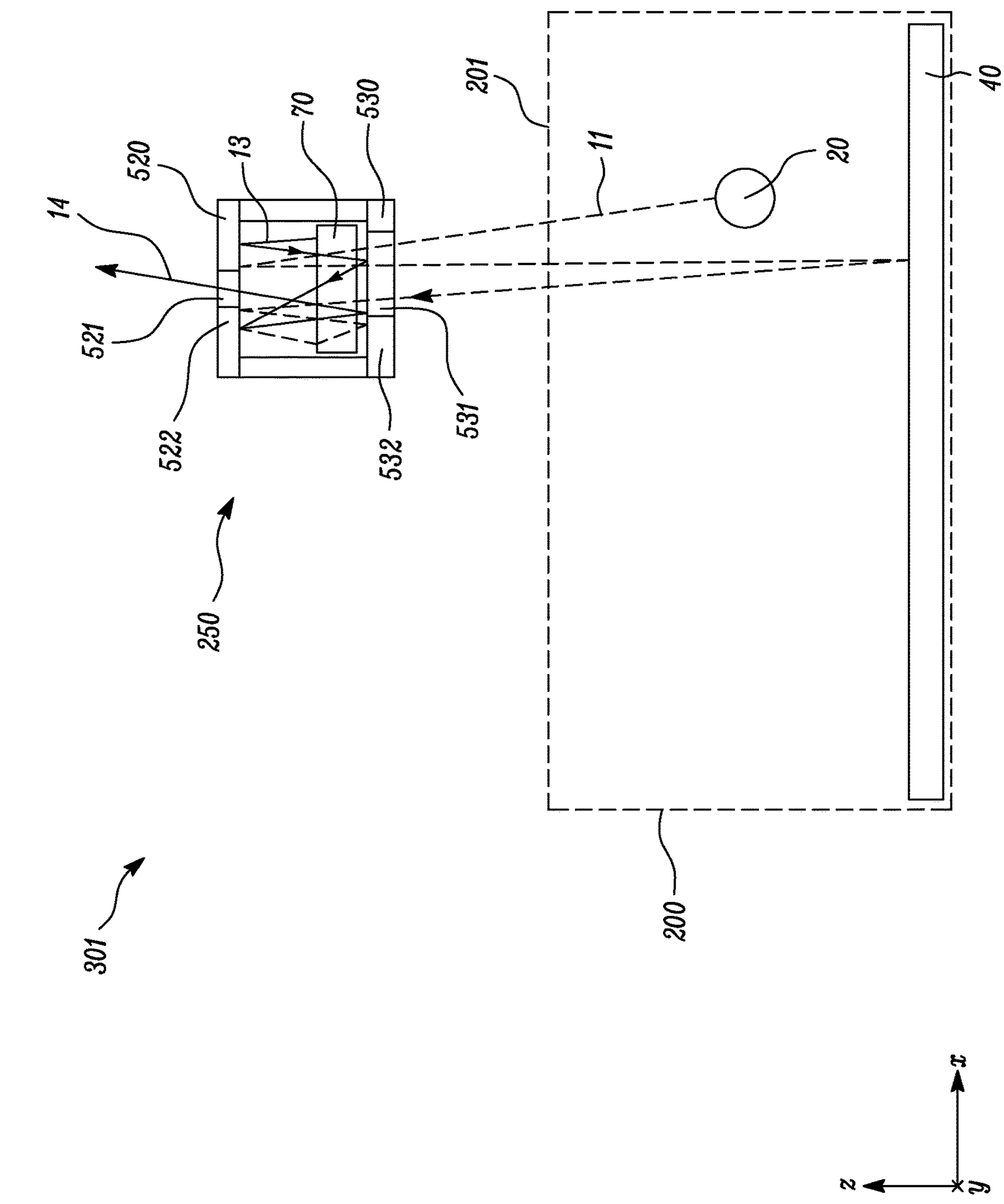
FIG. 10 illustrates a detailed schematic sectional view of an optical system, according to another embodiment of the present disclosure.

FIG. 10 illustrates a detailed schematic sectional view of another optical system 301, according to an embodiment of the present disclosure.

The optical system 301 includes the first light source 20. In some embodiments, the optical system 301 may include the backlight 200 including the first light source 20 and the back reflector 40. The first light source 20 is configured to emit the first light 11 having the first wavelength. The optical system 301 further includes an optical structure 250 configured to receive the first light 11 emitted by the first light source 20. In some embodiments, the optical structure 250 may be configured to receive the test material 70 therein. The test material 70 may be configured to emit the emitted second light 13 having the second wavelength in response to the first light 11 having the first wavelength.

The optical structure 250 includes a top wall 520 defining an output window 521 therein. In some embodiments, the area of the output window 521 is less than about 30% of an area of the top wall 520. In some embodiments, the area of the output window 521 is less than about 25%, less than about 20%, less than about 15%, less than about 10%, or less than about 5% of the area of the top wall 520.

The optical structure 250 further includes a bottom wall 530 facing the top wall 520. The optical structure 250 further includes an input wall defining an input window 531 therein. In the illustrated embodiment of FIG. 10, the input wall is the bottom wall 530.

In some embodiments, for a substantially normally incident light (e.g., the incident light 12 shown in FIG. 4A), the input wall reflects at least 60% of the incident light for each of the first wavelength and the different second wavelength. In some embodiments, for the substantially normally incident light, the input wall reflects at least 70%, at least 80%, or at least 90% of the incident light for each of the first wavelength and the different second wavelength. Therefore, the input wall may substantially reflect the first light 11 and the emitted second light 13.

In some embodiments, the area of the input window 531 is less than about 30% of an area of the bottom wall 530. In some embodiments, the area of the input window 531 is less than about 25%, less than about 20%, less than about 15%, less than about 10%, or less than about 5% of the area of the bottom wall 530.

In some embodiments, at least one of the input and output windows 521, 531 includes a physical through opening. In some embodiments, the area of the input window 531 is greater than the area of the output window 521. In some embodiments, at least one of the top and bottom walls 520, 530 is similar in construction to the back reflector 40 (described in FIG. 3). In some embodiments, at least one of the top and bottom walls 520, 530 includes the plurality of microlayers 55, 56 numbering at least 20 in total, each of the microlayers 55, 56 having the average thickness tm of less than about 500 nm. Further, in some embodiments, the at least one of the top and bottom walls 520, 530 includes the at least one skin layer 57 having the average thickness ts of greater than about 500 nm.

Each of a first region 522 of the top wall 520 adjacent the output window 521, and the bottom wall 530 has an optical reflectivity similar to the at least first region 54 of the front reflector (described in FIG. 4A) and the back reflector 40 (described in FIG. 4B), respectively. Therefore, for a substantially normally incident light (e.g., the incident light 12 shown in FIG. 4A) each of the first region 522 of the top wall 520 adjacent the output window 521 and the bottom wall 530 reflects at least 60% of the incident light (not shown) for each of the first wavelength and the different second wavelength. Thus, each of the first region 522 of the top wall 520 adjacent the output window 521 and the bottom wall 530 reflects at least 60% of each of the first light 11 and the emitted second light 13.

For the substantially normally incident light, the output window 521 transmits at least 60% of the incident light having the second wavelength. In some embodiments, for the substantially normally incident light, the output window 521 transmits at least 70%, at least 80%, or at least 90% of the incident light having the second wavelength. Further, for the substantially normally incident light, the output window 521 reflects at least 60% of the incident light having the first wavelength. In some embodiments, for the substantially normally incident light, the output window 521 reflects at least 70%, at least 80%, or at least 90% of the incident light having the first wavelength. Thus, the output window 521 may substantially transmit the emitted second light 13 and substantially reflect the first light 11.

For the substantially normally incident light, the input window 531 reflects at least 60% of the incident light having the second wavelength. In some embodiments, for the substantially normally incident light, the input window 531 reflects at least 70%, at least 80%, or at least 90% of the incident light having the second wavelength. Thus, the input window 531 substantially reflects the emitted second light 13. Therefore, the input window 531 may facilitate recycling of the emitted second light 13.

Further, for the substantially normally incident light, the input window 531 transmits at least 60% of the incident light having the first wavelength. In some embodiments, for the substantially normally incident light, the input window 531 transmits at least 70%, at least 80%, or at least 90% of the incident light having the first wavelength. Thus, the input window 531 may substantially transmit the first light 11. This may ensure that the test material 70 receives the first light 11.

In some embodiments, a second region 532 of the bottom wall 530 adjacent the input window 531 reflects at least 60% of an incident light (not shown) for each of the first wavelength and the different second wavelength. In some embodiments, the second region 532 of the bottom wall 530 adjacent the input window 531 reflects at least 70%, at least 80%, or at least 90% of the incident light for each of the first wavelength and the different second wavelength. Thus, the second region 532 of the bottom wall 530 adjacent the input window 531 substantially reflects the first light 11 and the emitted second light 13.

The emitted second light 13 is configured to be recycled between the top and bottom walls 520, 530 and exit the optical structure 250 as the exiting light 14.

Figure 11A:
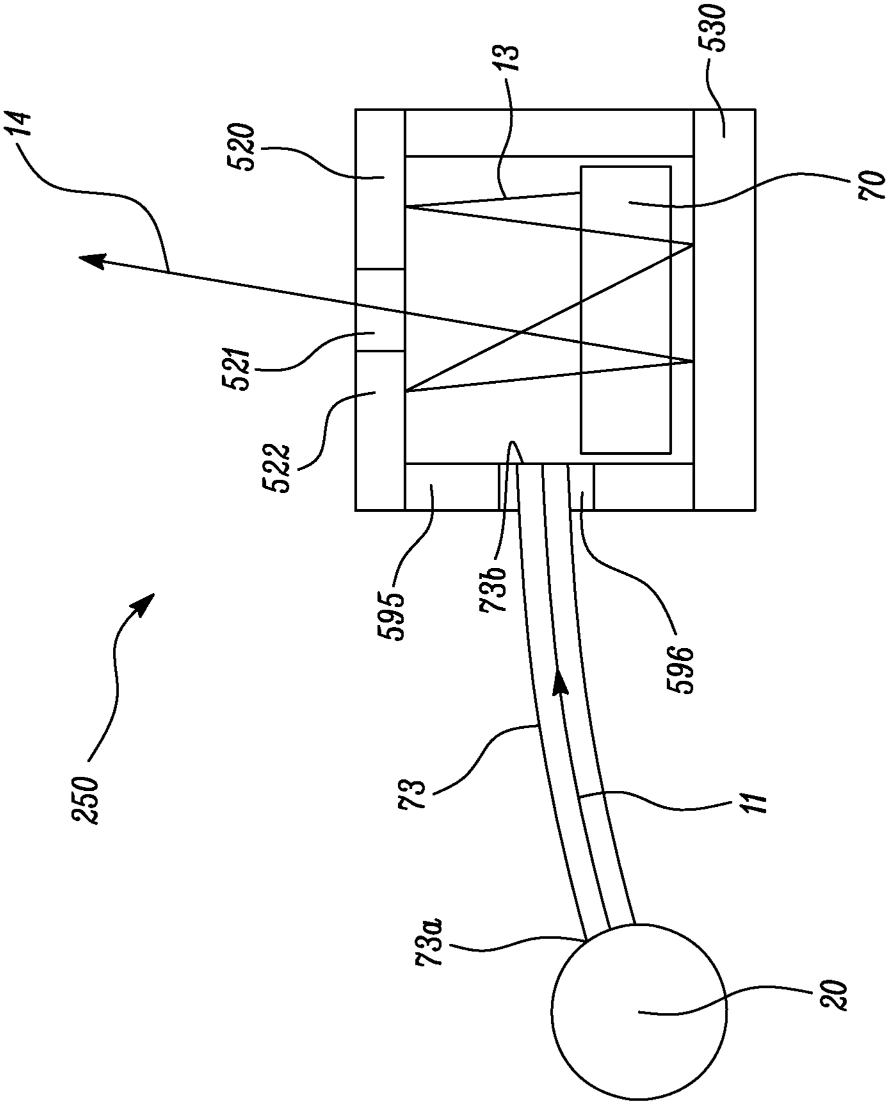
FIGS. 11A-11C illustrate detailed schematic sectional views of different optical structures, according to embodiments of the present disclosure.

FIG. 11A illustrates a detailed schematic representation of the optical structure 250 of the optical system 301 (shown in FIG. 10), according to another embodiment of the present disclosure. In some embodiments, the input wall is a side wall 595 joining the top and bottom walls 520, 530. In some embodiments, the side wall 595 defines an input window 596.

As discussed above, in some embodiments, for the substantially normally incident light, the input wall reflects at least 60% of the incident light for each of the first wavelength and the different second wavelength. Therefore, in some embodiments, for the substantially normally incident light, the side wall 595 reflects at least 60% of the incident light for each of the first wavelength and the different second wavelength. In some embodiments, the first light 11 emitted by the first light source 20 enters an optical fiber 73 from a first end 73*a* of the optical fiber 73 and exits the optical fiber 73 from a different second end 73*b* of the optical fiber 73. In some embodiments, the second end 73*b* is disposed in or near the input window 596. In some embodiments, the optical fiber 73 may be flexible. In some embodiments, the optical fiber 73 may be substantially rigid. In some embodiments, the optical fiber 73 may be an optical waveguide.

Figure 11B:
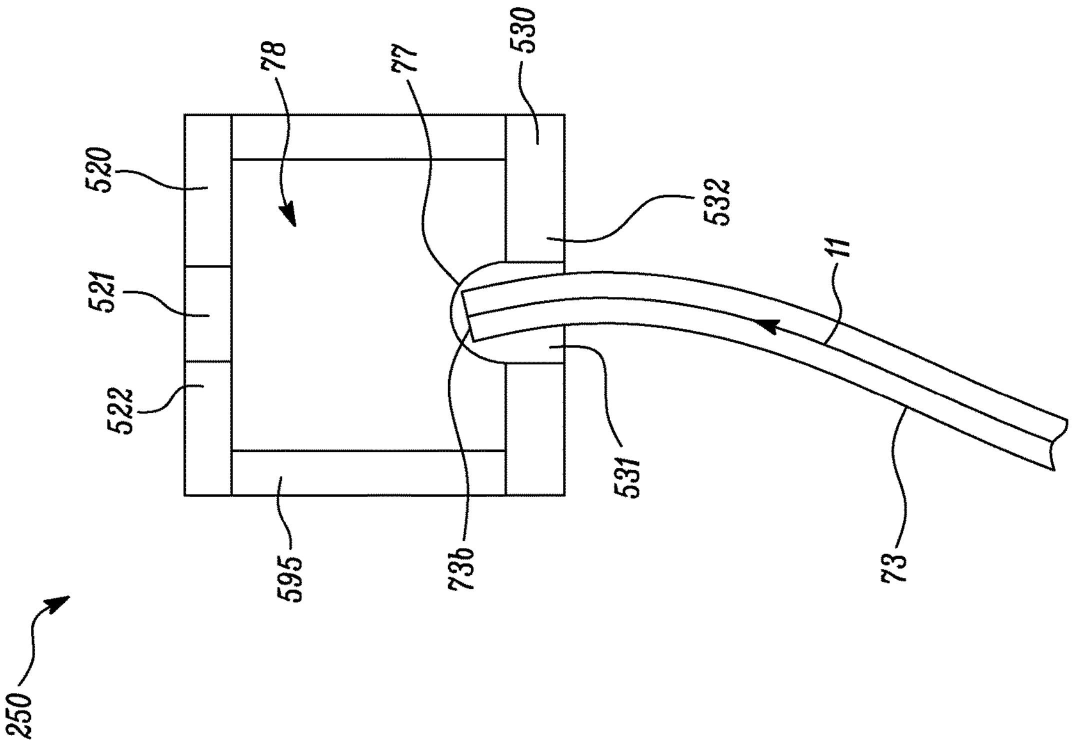

FIG. 11B illustrates another detailed schematic representation of the optical structure 250 of the optical system 301 (shown in FIG. 10), according to an embodiment of the present disclosure. In some embodiments, the input window 531 includes a receiving area 77 protruding in a cavity region 78 defined between the top and bottom walls 520, 530. In some embodiments, the second end 73*b* is disposed in the receiving area 77. In some embodiments, the receiving area 77 may secure the second end 73*b* of the optical fiber 73 in the cavity region 78. In some embodiments, the receiving area 77 may diffuse or collimate light.

Figure 11C:
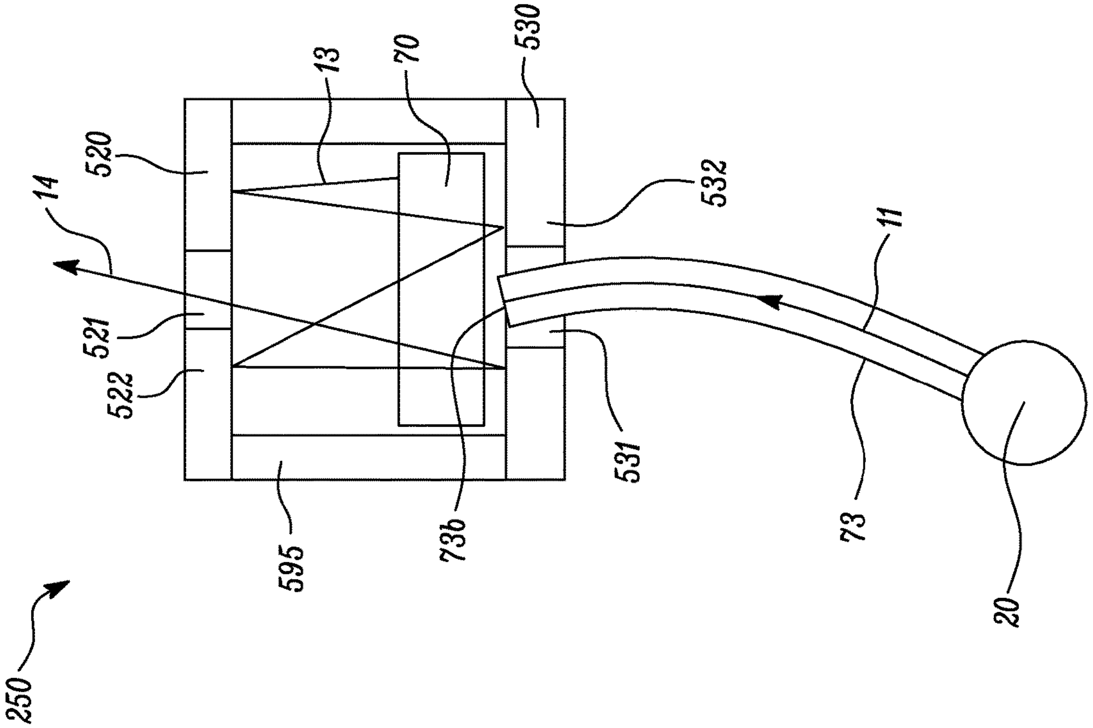

FIG. 11C illustrates another detailed schematic representation of the optical structure 250 of the optical system 301 (shown in FIG. 10), according to an embodiment of the present disclosure. In the illustrated embodiment of FIG. 11C, the second end 73*b* is disposed in or near the input window 531. Specifically, the second end 73*b* of the optical fiber 73 is disposed in or near the input window 531 of the bottom wall 530.

Figure 12A:
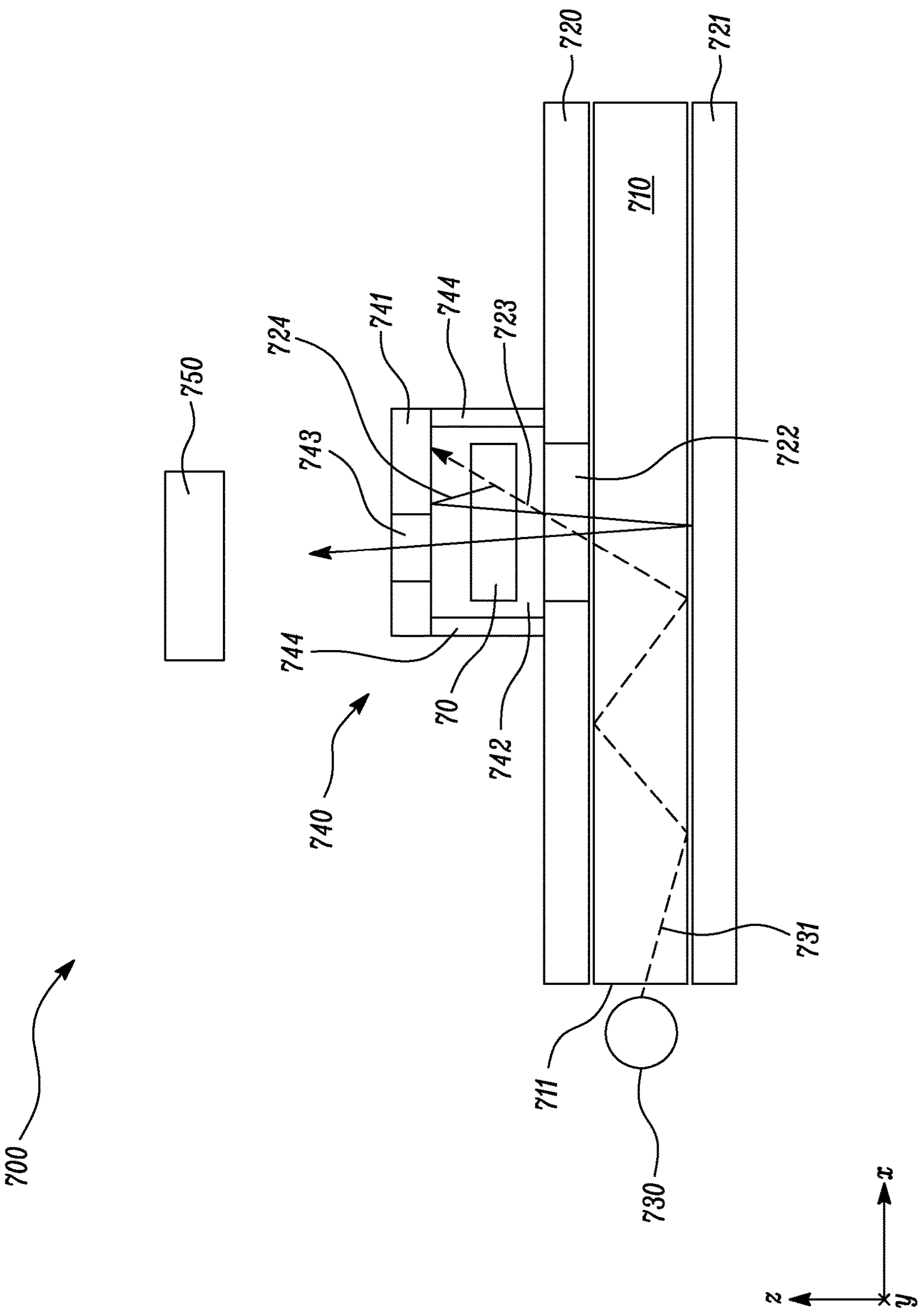
FIG. 12A illustrates a detailed schematic sectional view of an optical system, according to an embodiment of the present disclosure.

FIG. 12A illustrates a detailed schematic sectional view of an optical system 700, according to an embodiment of the present disclosure.

The optical system 700 includes a lightguide 710 disposed between and substantially co-extensive in a length L1 and a width W1 (shown in FIG. 12B) with first and second optical reflectors 720, 721. In some embodiments, the first and second optical reflectors 720, 721 are substantially co-extensive in the length L1 and the width W1 with each other. The optical system 700 further includes a light source 730 disposed at a side 711 of the lightguide 710. The light source 730 is configured to emit a first light 731 having the first wavelength. The lightguide 710 is configured to receive the emitted first light 731 through the side and propagate the received first light 731 therein along a length and a width of the lightguide 710.

The first optical reflector 720 defines a first through opening 722 therein, such that at least a portion 723 of the first light 731 propagating in the lightguide 710 is transmitted by the first optical reflector 720 through the first through opening 722.

The optical system 700 further includes an optical cell 740 disposed on the first optical reflector 720. The optical cell 740 includes a third optical reflector 741 opposite a bottom 742 (i.e., of the optical cell 740). The third optical reflector 741 defines a second through opening 743 therein. The bottom 742 of the optical cell 740 substantially covers the first through opening 722 of the first optical reflector 720 so that the first light 731 transmitted by the first through opening 722 enters the optical cell 740.

The optical cell 740 is configured to receive therein the test material 70 configured to emit a second light 724 having the second wavelength different than the first wavelength, in response to being at least illuminated by the first light 731 entering the optical cell 740. The emitted second light 724 exits the optical cell 740 through the second through opening 743 of the third optical reflector 741.

In some embodiments, the optical cell 740 further includes one or more side walls 744 extending from the third optical reflector 741 to the bottom 742 of the optical cell 740.

In some embodiments, at least one of the first through third optical reflectors 720, 721, 741 is substantially similar in construction to the back reflector 40 (described in FIG. 3). In some embodiments, the at least one of the first through third optical reflectors 720, 721, 741 includes the plurality of microlayers 55, 56 numbering at least 20 in total, each of the microlayers 55, 56 having the average thickness tm of less than about 500 nm. Further, in some embodiments, the at least one of the first through third optical reflectors 720, 721, 741 includes the at least one skin layer 57 having the average thickness ts of greater than about 500 nm.

In some embodiments, at least one of the one or more side walls 744 is substantially similar in construction to the back reflector 40 (described in FIG. 3). In some embodiments, the at least one of the one or more side walls 744 includes the plurality of microlayers 55, 56 numbering at least 20 in total, each of the microlayers 55, 56 having the average thickness tm of less than about 500 nm. Further, in some embodiments, the at least one of the one or more side walls 744 includes the at least one skin layer 57 having the average thickness ts of greater than about 500 nm.

Further, for a substantially normally incident light (e.g., the incident light 12) having the second wavelength, the one or more side walls 744 have an optical reflectance of at least 60%. In some embodiments, for the substantially normally incident light having the second wavelength, the one or more side walls have the optical reflectance of at least 70%, at least 80%, at least 90%, at least 95%, or at least 99%. Therefore, the one or more side walls 744 may substantially reflect the emitted second light 724.

In some embodiments, the optical system 700 further includes an optical detector 750 for receiving and detecting the emitted second light 724 exiting the optical cell 740. Specifically, the optical detector 750 may receive and detect the emitted second light 724 exiting the optical cell 740 through the second through opening 743.

Figure 12B:
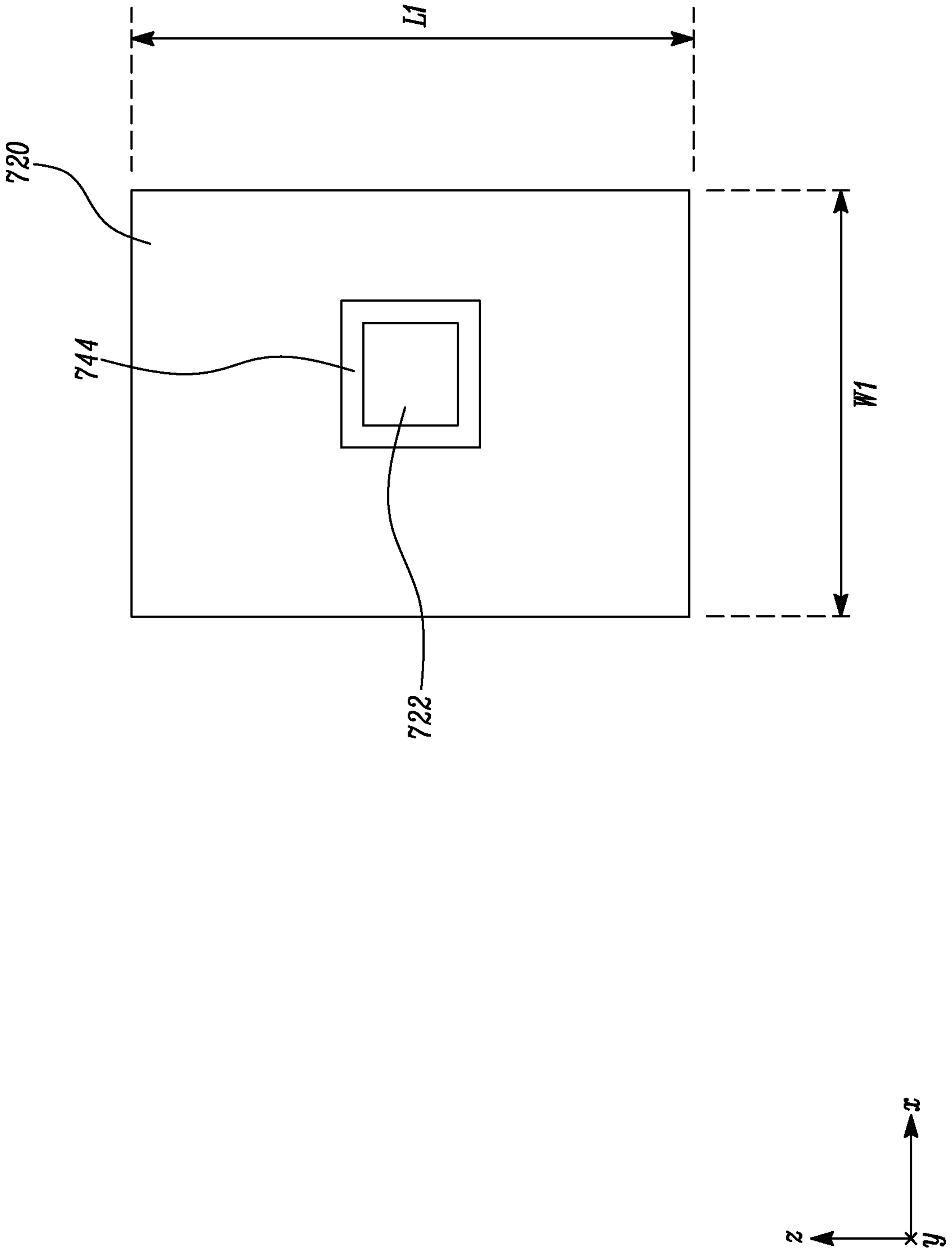
FIG. 12B illustrates a schematic top view of a first optical reflector of the optical system of FIG. 12A, according to an embodiment of the present disclosure.

FIG. 12B illustrates a schematic top view of the first optical reflector 720, according to an embodiment of the present disclosure. Specifically, FIG. 12B illustrates the schematic top view of the top reflector 720, in the x-y plane. The top reflector 720 defines the length L1 and the width W1 along the y- and x-axes, respectively. FIG. 12B further illustrates the side walls 744 and the first through opening 722 defined in the first optical reflector 720. The side walls 744 substantially surround the first through opening 722. The third optical reflector 741 is not shown in FIG. 12B.

Figure 12D:
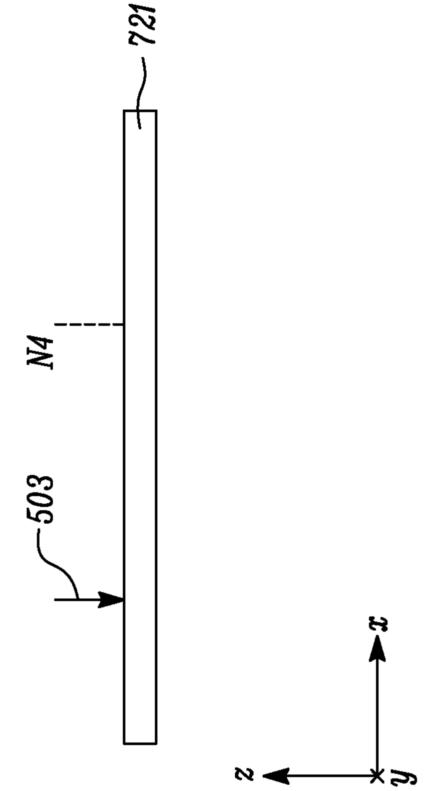
FIG. 12D illustrates a schematic sectional view of a second optical reflector, according to an embodiment of the present disclosure.
Figure 12C:
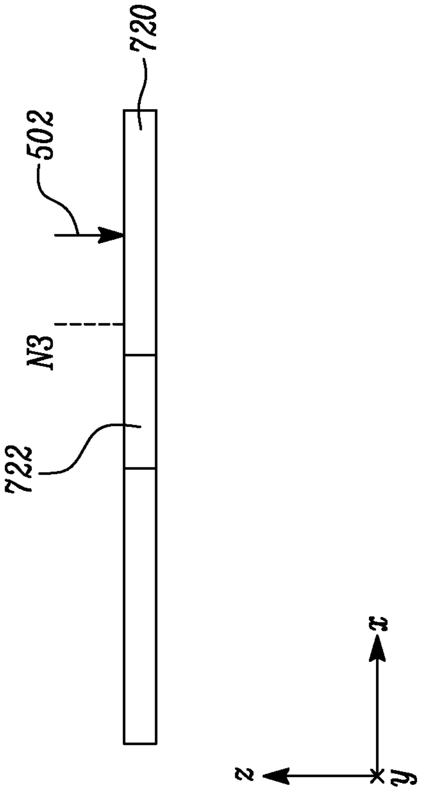
FIG. 12C illustrates a schematic sectional view of the first optical reflector, according to an embodiment of the present disclosure.

FIG. 12C illustrates a schematic sectional view of the first optical reflector 720 of the optical system 700 (shown in FIG. 12A), according to an embodiment of the present disclosure. FIG. 12C further illustrates a substantially normally incident light 502 incident on the first optical reflector 720, i.e., the substantially normally incident light 502 is incident at an angle of about 0 degree with respect to a normal N3 to the first optical reflector 720. In some embodiments, the normal N3 may be substantially along the z-axis of the optical system 700.

FIG. 12D illustrates a schematic sectional view of the second optical reflector 721 of the optical system 700 (shown in FIG. 12A), according to an embodiment of the present disclosure. FIG. 12D further illustrates a substantially normally incident light 503 incident on the second optical reflector 721, i.e., the substantially normally incident light 503 is incident at an angle of about 0 degree with respect to a normal N4 to the second optical reflector 721. In some embodiments, the normal N4 may be substantially along the z-axis of the optical system 700.

Figure 12E:
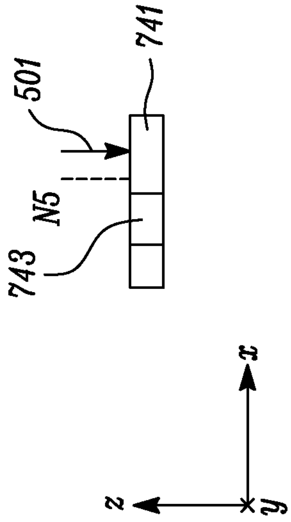
FIG. 12E illustrates a schematic sectional view of a third optical reflector, according to an embodiment of the present disclosure.

FIG. 12E illustrates a schematic sectional view of the third optical reflector 741 of the optical system 700 (shown in FIG. 12A), according to an embodiment of the present disclosure. FIG. 12E further illustrates a substantially normally incident light 501 incident on the third optical reflector 741, i.e., the substantially normally incident light 501 is incident at an angle of about 0 degree with respect to a normal N5 to the third optical reflector 741. In some embodiments, the normal N5 may be substantially along the z-axis of the optical system 700.

Referring to FIGS. 12C-12E, for the substantially normally incident light 502, 503, 501 having the second wavelength, each of the first through third optical reflectors 720, 721, 741 has an optical reflectance of at least 60% for regions of the first through third optical reflectors 720, 721, 741 away from any of the corresponding through openings 722, 743. In some embodiments, for the substantially normally incident light 502, 503, 501 having the second wavelength, each of the first through third optical reflectors 720, 721, 741 has the optical reflectance of at least 70%, at least 80%, at least 90%, at least 95%, or at least 99% for regions of the first through third optical reflectors 720, 721, 741 away from any of the corresponding through openings 722, 743.

Further, for the substantially normally incident light 502, 501 having the second wavelength, each of the first and second through openings 722, 743 has an optical transmittance of at least 60%. In some embodiments, for the substantially normally incident light 502, 501 having the second wavelength, each of the first and second through openings 722, 743 has the optical transmittance of at least 70%, at least 80%, at least 90%, at least 95%, or at least 99%.

Figure 13:
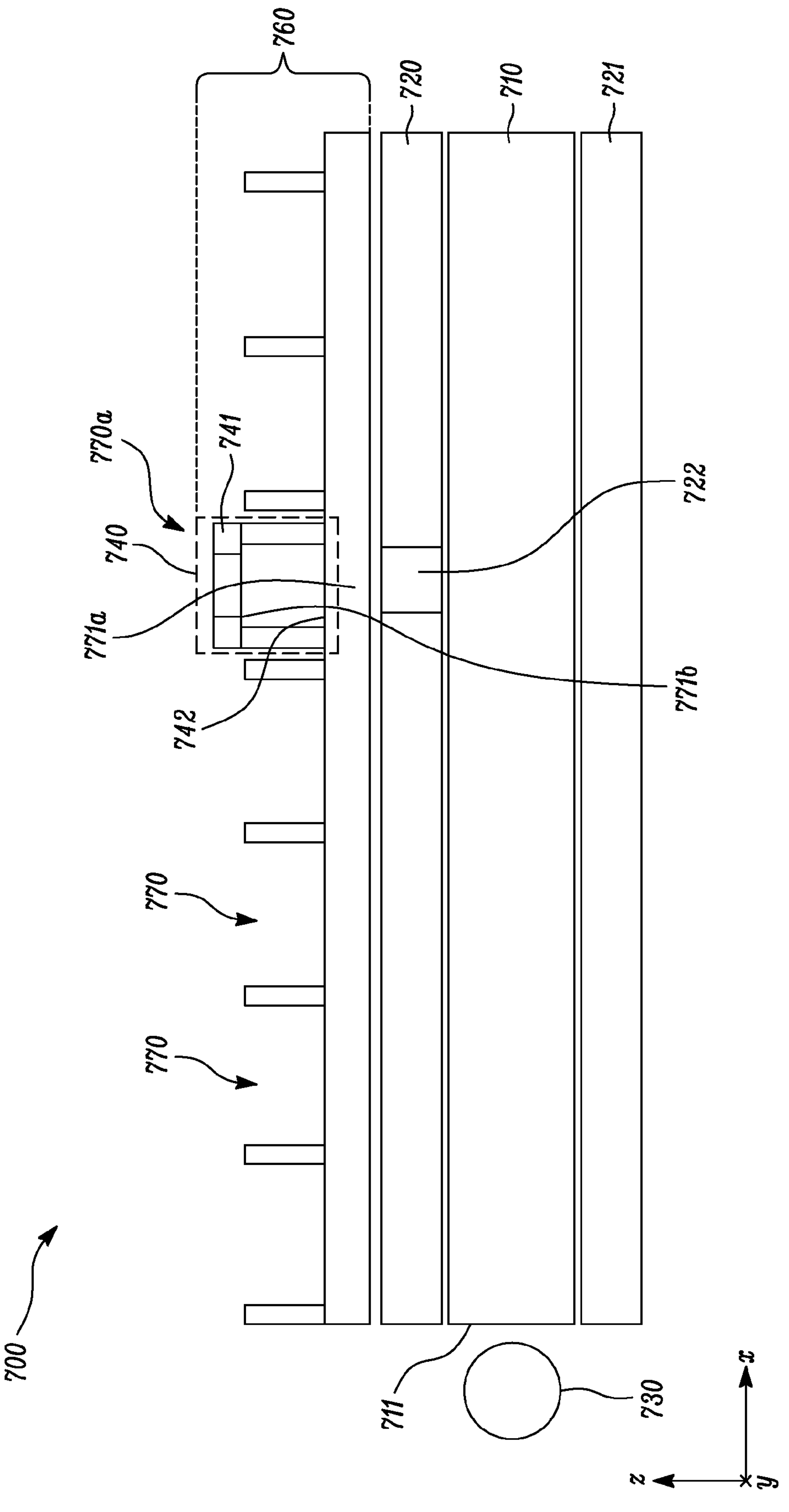
FIG. 13 illustrates a detailed sectional view of an optical system, according to another embodiment of the present disclosure.

FIG. 13 illustrates a detailed sectional view of the optical system 700, according to another embodiment of the present disclosure. In some embodiments, the optical system 700 includes a multi-well plate 760 disposed on the first 720, opposite the second 721, optical reflector. The multi-well plate 760 includes a plurality of spaced apart wells 770. In the illustrated example of FIG. 13, a bottom wall 771*a* of a first well 770*a* in the plurality of spaced apart wells 770 is substantially aligned with and covers the first through opening 722 of the first optical reflector 720. The optical cell 740 is disposed on the first well 770*a*. The third optical reflector 741 is disposed near a top 771*b* of the first well 770*a* and the bottom 742 of the optical cell 740 is disposed near the bottom wall 771*a* of the first well 770*a*.

In some embodiments, the bottom wall 771*a* of the first well 770*a* has an optical transmittance of at least 60% at the second wavelength. In some embodiments, the bottom wall 771*a* of the first well 770*a* has the optical transmittance of at least 70%, at least 80%, at least 90%, at least 95%, or at least 99% at the second wavelength. Thus, the bottom wall 771*a* of the first well 770*a* substantially transmits the emitted second light 724 (shown in FIG. 12A). The emitted second light 724 may therefore be transmitted through the first through opening 722 toward the second optical reflector 721 for recycling of the emitted second light 724.

Further, more than one optical cell 740 may be placed in a corresponding spaced apart well 770. This may allow analysis of more than one test material 70 simultaneously or sequentially using the optical system 700.

Figure 14:
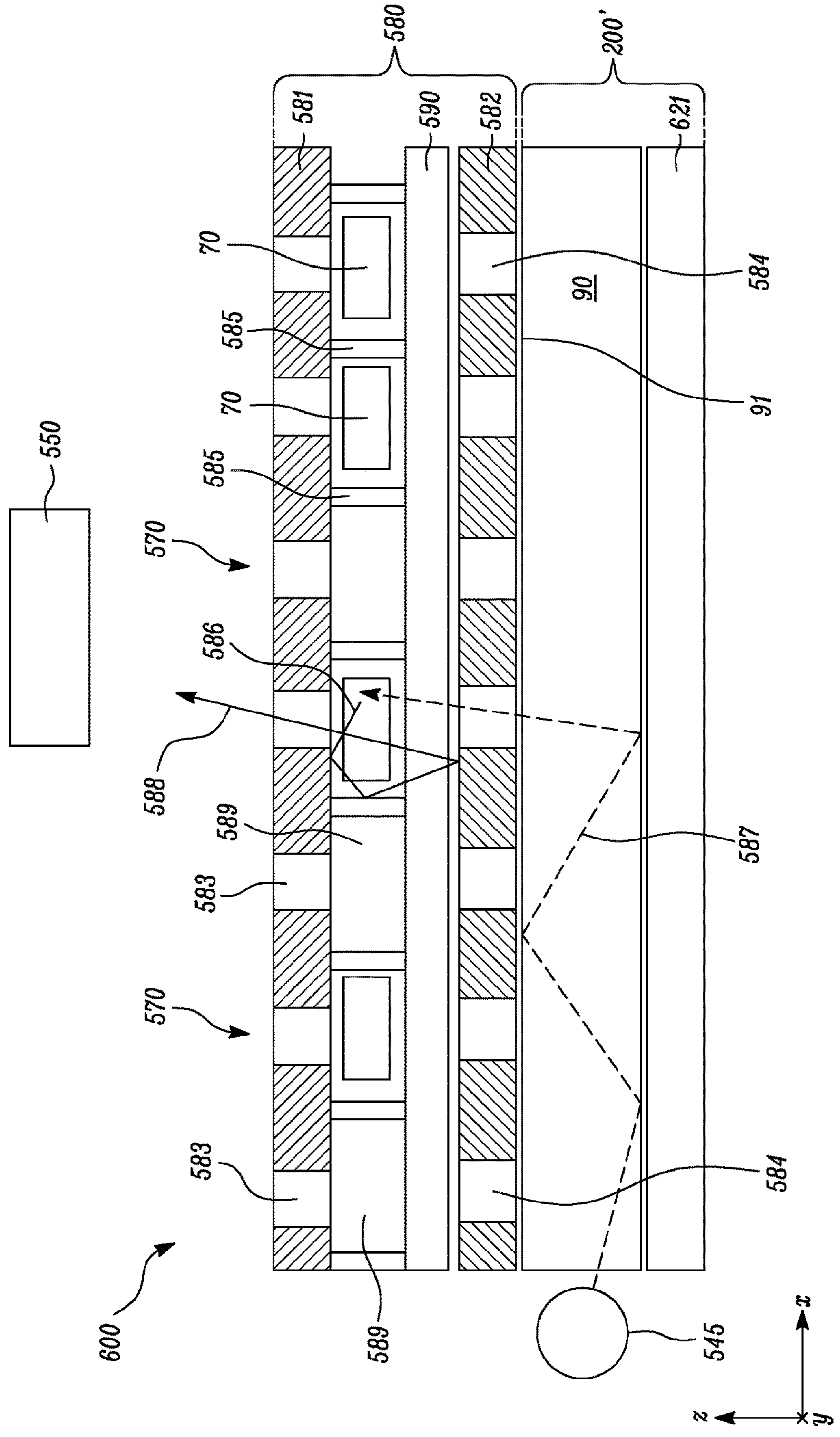
FIG. 14 illustrates a detailed schematic sectional view of an optical detection system, according to an embodiment of the present disclosure.

FIG. 14 illustrates a detailed schematic sectional view of an optical detection system 600, according to another embodiment of the present disclosure.

The optical detection system 600 includes a backlight 200' configured to emit a first light 587 from an emission surface 91 thereof. The backlight 200' includes at least one light source 545 configured to produce the first light 587. The backlight 200' further includes a back reflector 621 for redirecting the first light 587 produced by the at least one light source 545. The emission surface 91 and the back reflector 621 are substantially co-extensive with each other in length and width.

The optical detection system 600 further includes an optically recycling multi-well plate 580 disposed on the emission surface 91 of the backlight 200'. The optically recycling multi-well plate 580 includes a plurality of spaced apart wells 570. In some embodiments, the wells in the plurality of spaced apart wells 570 are supported by a substrate 590.

Each well 570 includes a top reflector 581 defining a first opening 583 therein. Each well 570 further includes a bottom reflector 582 defining a second opening 584 therein. Each well 570 further includes one or more side walls 585 extending from the top reflector 581 to the bottom reflector 582.

In some embodiments, the top reflectors 581 of the wells in the plurality of spaced apart wells 570 are connected so as to form a continuous top reflector. In some embodiments, the bottom reflectors of the wells in the plurality of spaced apart wells 570 are connected so as to form a continuous bottom reflector.

In some embodiments, at least one of the top and bottom reflectors 581, 582 and the one or more side walls 585 is similar in construction to the back reflector 40 (described in FIG. 3). In some embodiments, at least one of the top and bottom reflectors 581, 582 and the one or more side walls 585 includes the plurality of microlayers 55, 56 numbering at least 20 in total, each of the microlayers 55, 56 having the average thickness tm of less than about 500 nm. Further, in some embodiments, the at least one of the top and bottom reflectors 581, 582 and the one or more side walls 585 includes the at least one skin layer 57 having the average thickness ts of greater than about 500 nm.

The top and bottom reflectors 581, 582 define a recycling optical cavity 589 therebetween. The first light 587 enters the recycling optical cavity 589 through the second opening 584 of the bottom reflector 582. Specifically, the recycling optical cavity 589 of each of the wells 570 in the plurality of spaced apart wells 570 is configured to receive, through the second opening 584 of the bottom reflector 582 of the well 570, at least a portion of the first light 587 emitted from the emission surface 91 of the backlight 200'.

The recycling optical cavity 589 is configured to receive therein the test material 70 configured to emit a second light 586 having a second wavelength in response to being at least illuminated by the first light 587 having a different first wavelength.

For at least the second wavelength, each of the top and bottom reflectors 581, 582 has an optical reflectance of at least 60% for regions of the top and bottom reflectors 581, 582 away from the corresponding openings 583, 584. In some embodiments, for at least the second wavelength, each of the top and bottom reflectors 581, 582 has the optical reflectance of at least 70%, at least 80%, at least 90%, at least 95%, or at least 99% for regions of the top and bottom reflectors 581, 582 away from the corresponding openings 583, 584. Therefore, the regions of the top and bottom reflectors 581, 582 away from the corresponding openings 583, 584 may substantially reflect the emitted second light 586.

In some embodiments, for each of the first and second wavelengths, each of the top and bottom reflectors 581, 582 has an optical reflectance of at least 60% for regions of the top and bottom reflectors 581, 582 away from the corresponding openings 583, 584. In some embodiments, for each of the first and second wavelengths, each of the top and bottom reflectors 581, 582 has the optical reflectance of at least 70%, at least 80%, at least 90%, at least 95%, or at least 99% for regions of the top and bottom reflectors 581, 582 away from the corresponding openings 583, 584. Therefore, the regions of the top and bottom reflectors 581, 582 away from the corresponding openings 583, 584 may substantially reflect the first light 587 as well as the emitted second light 586.

Further, for a substantially normally incident light (not shown) having the second wavelength, and for at least the second wavelength, the one or more side walls 585 of each of the wells 570 has an optical reflectance of at least 60%. In some embodiments, for the substantially normally incident light having the second wavelength, and for at least the second wavelength, the one or more side walls 585 of each of the wells 570 has the optical reflectance of at least 70%, at least 80%, at least 90%, at least 95%, or at least 99%. Therefore, the one or more side walls 585 may substantially reflect the emitted second light 586.

The emitted second light 586 exits the well 570 through the first opening 583 of the top reflector 581 after being recycled in the recycling optical cavity 589 as an exiting light 588. Specifically, the emitted second light 586 exits the well 570 through the first opening 583 of the top reflector 581 after being recycled between the top and bottom reflectors 581, 582. In some embodiments, the emitted second light 586 exits the well 570 through the first opening 583 of the top reflector 581 after being reflected at least once by the one or more side walls 585. The recycling affects an optical intensity of the exiting light 588. In some embodiments, the optical detection system 600 further includes an optical detector 550 for receiving and detecting the exiting light 588. The exiting light 588 may be easier to detect by the optical detector 550 than the emitted second light 586 which is not recycled in the recycling optical cavity 589.

In addition, the optically recycling multi-well plate 580 may allow analysis of more than one test material 70 simultaneously or sequentially using the backlight 200' of the optical detection system 600.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical system comprising:

a backlight configured to emit a light from an emission surface thereof and comprising:

at least one light source configured to emit a first light having at least a first wavelength; and at least one light redirecting film disposed on a back reflector for at least redirecting the first light emitted by the at least one light source, the emission surface, the at least one light redirecting film and the back reflector substantially co-extensive with each other in length and width; and a front reflector disposed on the back reflector and defining a recycling optical cavity therebetween, the front reflector defining at least one opening therein, such that for a substantially normally incident light:

each of the back reflector and at least a first region of the front reflector adjacent the at least one opening reflects at least 60% of the incident light for each of the at least the first wavelength and a different at least a second wavelength; and the at least one opening and the at least first region of the front reflector have respective optical transmittances T1 and T2 at the at least the second wavelength, T1>1.2 T2;

such that when a test material is disposed in the recycling optical cavity, the test material is configured to emit a second light having the at least the second wavelength in response to a stimulus, and the emitted second light exits the optical system through the at least one opening of the front reflector after being recycled in the recycling optical cavity, the recycling affecting an optical intensity of the exiting light.

2. The optical system of claim 1, wherein the stimulus comprises an optical stimulus, such that in response to the light emitted by the backlight having the at least the first wavelength, the test material emits the second light having the at least the second wavelength.

3. The optical system of claim 1, wherein the stimulus comprises a chemical stimulus, such that in response to a chemical reaction, the test material emits the second light having the at least the second wavelength.

4. The optical system of claim 1, wherein at least one of the at least one opening is a physical through opening extending from a first major surface of the front reflector to an opposite second major surface of the front reflector.

5. The optical system of claim 1, wherein the backlight further comprises:

a lightguide for propagating the first light therein along a length and a width of the lightguide, the lightguide disposed between the at least one light redirecting film and the back reflector, the back reflector configured to reflect light that exits the lightguide propagating toward the back reflector, the reflected light propagating toward the at least one light redirecting film; and a reflective polarizer disposed on the at least one light redirecting film and comprising the emission surface of the backlight.

6. An optical system comprising:

a backlight configured to provide substantially polarized uniform illumination to a display panel through an emission surface thereof and comprising a back reflector substantially co-extensive in length and width with the emission surface; and a plurality of optical cells disposed on and arranged across the emission surface, each of the optical cells comprising:

a top wall disposed on, and spaced apart from, the emission surface and defining at least one output window therein having a total area A1 and surrounded by a remaining portion of the top wall, the top wall and the back reflector of the backlight defining an optical recycling cavity therebetween, such that for a substantially normally incident light having a signal wavelength, each of the back reflector and the remaining portion of the top wall has an optical reflectance of at least 60% and the at least one output window has an optical transmittance of at least 60%, the optical cell configured to receive therein a test material configured to emit a signal light having the signal wavelength in response to a stimulus, the emitted signal light exiting the optical cell through the at least one output window after being recycled in the recycling optical cavity, the recycling enhancing an optical intensity of the exiting light.

7. The optical system of claim 6, wherein each of the optical cells further comprises a bottom wall disposed between the top wall and the emission surface and defining at least one input window therein having a total area A2, A2>A1.

8. The optical system of claim 6, wherein each of the optical cells further comprises one or more side walls extending from the top wall toward the emission surface, and wherein for a substantially normally incident light having the signal wavelength, the one or more side walls has an optical reflectance of at least 60%.

9. The optical system of claim 6, wherein the at least one output window comprises a physical through opening extending from a first outermost major surface of the top wall to an opposite second outermost major surface of the top wall.

10. An optical construction comprising:

a bottom reflector;

a top reflector disposed on the bottom reflector; and a middle reflector disposed between the top and bottom reflectors, the top reflector defining therein a plurality of spaced apart top groups of one or more top openings, the middle reflector defining therein a plurality of spaced apart middle groups of one or more middle openings, the top and middle groups in a one-to-one correspondence with each other, such that for each of the corresponding groups of one or more top and middle openings:

a total area of the top openings is less than a total area of the middle openings; and the one or more top and middle openings are configured to receive a test material therebetween, the test material configured to emit a signal light having a signal wavelength in response to a stimulus, such that for a substantially normally incident light having the signal wavelength, each of the top, middle and bottom reflectors has an optical reflectance of at least 60% and each of the top and middle openings has an optical transmittance of at least 60%.

* * * * *